US012212779B2

(12) United States Patent
Jeong et al.

(10) Patent No.: US 12,212,779 B2
(45) Date of Patent: Jan. 28, 2025

(54) METHOD OF PROCESSING IMMERSIVE VIDEO AND METHOD OF PRODUCING IMMERSIVE VIDEO

(71) Applicant: ELECTRONICS AND TELECOMMUNICATIONS RESEARCH INSTITUTE, Daejeon (KR)

(72) Inventors: Jun Young Jeong, Daejeon (KR); Kug Jin Yun, Daejeon (KR); Gwang Soon Lee, Daejeon (KR); Hong Chang Shin, Daejeon (KR); Ho Min Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 644 days.

(21) Appl. No.: 17/339,579

(22) Filed: Jun. 4, 2021

(65) Prior Publication Data
US 2021/0383122 A1 Dec. 9, 2021

(30) Foreign Application Priority Data

Jun. 5, 2020 (KR) .......... 10-2020-0068653
Jun. 18, 2020 (KR) .......... 10-2020-0074169
(Continued)

(51) Int. Cl.
H04N 19/597 (2014.01)
G06F 18/25 (2023.01)
(Continued)

(52) U.S. Cl.
CPC .......... *H04N 19/597* (2014.11); *G06F 18/25* (2023.01); *G06T 7/40* (2013.01); *G06T 7/50* (2017.01);
(Continued)

(58) Field of Classification Search
CPC .... H04N 19/597; H04N 13/161; H04N 19/46; H04N 19/70; G06F 18/25; G06T 7/40; G06T 7/50; G06T 9/001; G06V 20/41
See application file for complete search history.

(56) References Cited

U.S. PATENT DOCUMENTS 11,798,196 B2 * 10/2023 Kim ................. G06T 17/20
2012/0122062 A1 5/2012 Yang et al.
(Continued)

FOREIGN PATENT DOCUMENTS

KR       10-1791919 B1    11/2017
KR       20200051784 A     5/2020
WO    WO-2018011042 A1 *   1/2018    ............. H04L 69/04

OTHER PUBLICATIONS

L. Kondrad et al., "IInternational Organisation for Standardisation Organisation Internationale De Normalisation Iso/Iec Jtc1/Sc29/Wg11 Coding of Moving Pictures and Audio," ISO/IEC JTC1/SC29/WG11 MPEG2020/m53125, Apr. 2020, pp. 1-4, Nokia Technologies, online meeting.

*Primary Examiner* — Matthew C Bella
*Assistant Examiner* — Andrew B. Jones

(57) ABSTRACT

A method of processing an immersive video includes classifying view images into a basic image and an additional image, performing pruning with respect to view images by referring to a result of classification, generating atlases based on a result of pruning, generating a merged atlas by merging the atlases into one atlas, and generating configuration information of the merged atlas.

7 Claims, 23 Drawing Sheets

(30) Foreign Application Priority Data

Jun. 22, 2020 (KR) .......................... 10-2020-0075557
Oct. 21, 2020 (KR) .......................... 10-2020-0136746
May 20, 2021 (KR) .......................... 10-2021-0064693

(51) Int. Cl.
- *G06T 7/40* (2017.01)
- *G06T 7/50* (2017.01)
- *G06T 9/00* (2006.01)
- *G06V 20/40* (2022.01)
- *H04N 13/161* (2018.01)
- *H04N 19/46* (2014.01)

(52) U.S. Cl.
CPC .............. *G06T 9/001* (2013.01); *G06V 20/41* (2022.01); *H04N 13/161* (2018.05); *H04N 19/46* (2014.11)

(56) References Cited

U.S. PATENT DOCUMENTS

| | | |
|---|---|---|
| 2015/0317057 A1 | 11/2015 | Choi et al. |
| 2020/0154121 A1* | 5/2020 | Boyce .................. H04N 19/132 |
| 2022/0078486 A1* | 3/2022 | Hannuksela ....... H04N 21/2393 |
| 2022/0360819 A1* | 11/2022 | Huang .................. H04N 19/597 |
| 2023/0209091 A1* | 6/2023 | Boyce .................. H04N 19/597 |
| | | 348/43 |

* cited by examiner

FIG. 12

M:TOTAL NUMBER OF MERGED ATLASES

ESSENTIAL INFORMATION

Merged atlas id = 0

| AVD-T atlas id = 0 | GVD atlas id = 0 |
| | OVD atlas id = 0 |
| AVD-T atlas id = 1 | GVD atlas id = 1 |
| | OVD atlas id = 1 |

Merged atlas id = J

| AVD-T atlas id = N | GVD atlas id = N |
| | OVD atlas id = N |

...

ADDITIONAL INFORMATION

Merged atlas id = J+1

| AVD-L atlas id = 1 | AVD-S atlas id = 1 | AVD-R atlas id = 1 |
| AVD-GI atlas id = 1 | AVD-L atlas id = 2 | AVD-S atlas id = 2 |
| AVD-R atlas id = 2 | AVD-GI atlas id = 2 | AVD-L atlas id = 3 |
| AVD-S atlas id = 3 | AVD-R atlas id = 3 | AVD-GI atlas id = 3 |

Merged atlas id = M

| AVD-L atlas id = N | AVD-S atlas id = N | AVD-R atlas id = N |
| AVD-R atlas id = N | | |

M: TOTAL NUMBER OF MERGED ATLASES

GROUP # 0
Merged atlas id = 0

| AVD-T atlas id = 0 | GVD atlas id = 0 | OVD atlas id = 0 |
| | AVD-L atlas id = 0 | AVD-S atlas id = 0 |
| AVD-T atlas id = 1 | | |

⋮

Merged atlas id = J

| AVD-T atlas id = i | GVD atlas id = i | OVD atlas id = i |
| | AVD-L atlas id = i | AVD-S atlas id = i | AVD-R atlas id = i |
| | AVD-GI atlas id = i | | |

⋮

GROUP # M
Merged atlas id = J+1

| AVD-T atlas id = i+1 | GVD atlas id = i+1 | OVD atlas id = i+1 |
| | AVD-L atlas id = i+1 | AVD-S atlas id = i+1 |
| AVD-T atlas id = i+2 | | |

⋮

Merged atlas id = K

| AVD-T atlas id = N | GVD atlas id = N | OVD atlas id = N |
| | AVD-L atlas id = N | AVD-S atlas id = N | AVD-R atlas id = N |
| | AVD-GI atlas id = N | | |

FIG. 16
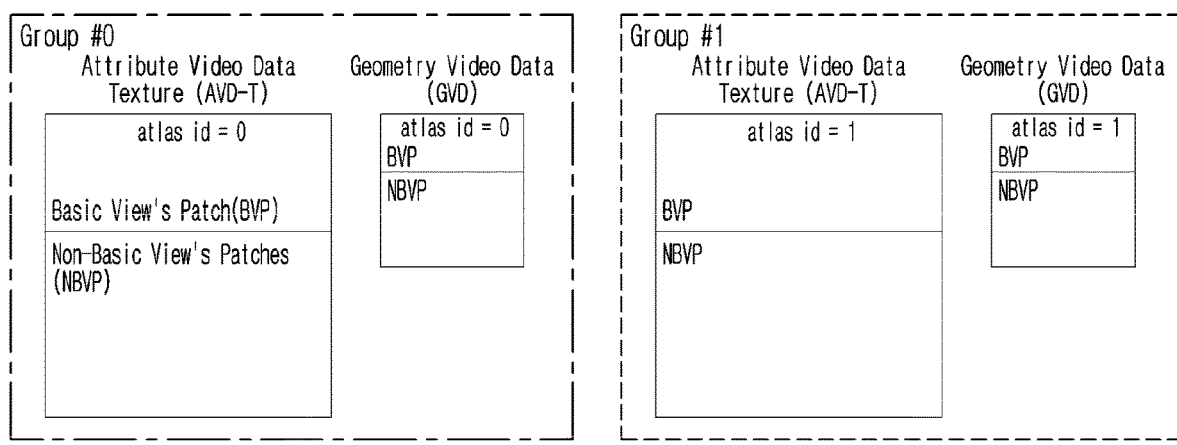
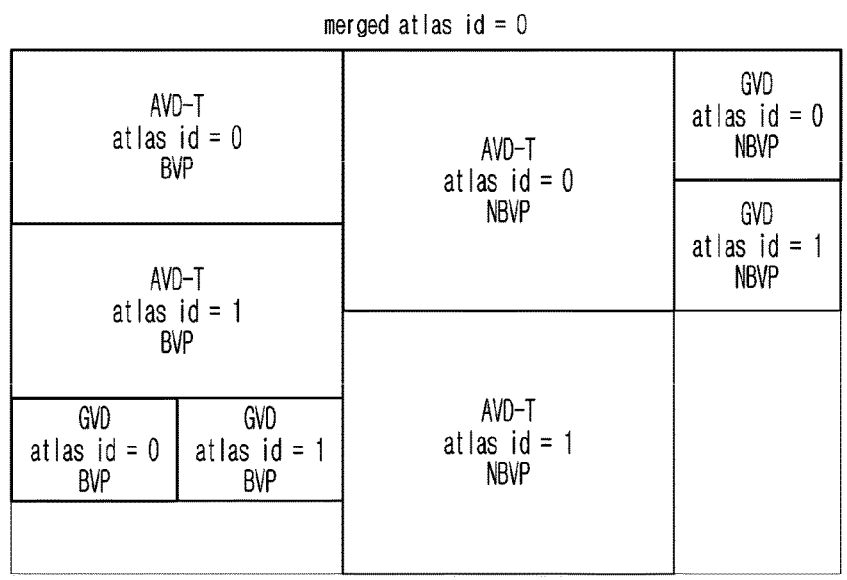

| v3c_parameter_set() { | Descriptor |
|---|---|
|   profile_tier_level() | |
|   vps_v3c_parameter_set_id | u(4) |
|   vps_reserved_zero_8bits | u(8) |
|   vps_atlas_count_minus1 | u(6) |
|   for(j=0;j<vps_atlas_count_minus 1+1;j++){ | |
|     vps_arlas_id[j] | u(6) |
|     vps_frame_width[j] | u(16) |
|     vps_frame_height[j] | u(16) |
|     vps_map_count_minus1[j] | u(4) |
|     if(vps_map_count_minus1[j]>0 | |
|       vps_multiple_map_streams_present_flag[j] | u(1) |
|     vps_map_absolute_coding_enabled_flag[j][0]=1 | |
|     vps_map_predictor_index_diff[j][0]=0 | |
|     for(i=1;i<=vps_map_count_minus1[j];i++){ | |
|       if(vps_multiple_map_streams_present_flag[j]) | |
|         vps_map_absolute_coding_enabled_flag[j][i] | u(1) |
|       else | |
|         vps_map_absolute_coding_enabled_flag[j][i]=1 | |
|       if(vps_map_absolute_coding_enabled_flag[j][i]==0){ | |
|         vps_map_predictor_index_diff[j][i] | ue(v) |
|       } | |
|     } | |
|     vps_auxiliary_video_present_flag[j] | u(1) |
|     vps_occupancy_video_present_flag[j] | u(1) |
|     vps_geometry_video_present_flag[j] | u(1) |
|     vps_attribute_video_present_flag[j] | u(1) |
|     vps_merged_video_present_flag[j] | u(1) |
|     if(vps_occupancy_video_present_flag[j]) | |
|       occupancy_information (j) | |
|     if(vps_geometry_video_present_flag[j]) | |
|       geometry information (j) | |
|     if(vps_attribute_video_present_flag[j]) | |
|       attribute_information (j) | |
|     if(vps_merged_video_present_flag[j]) | |
|       merged_video_information(j) | |
|   } | |

| merged_video_information(atlasIdx){ | Descriptor |
|---|---|
|     mvi_merged_video_count_minus1 | u(6) |
|     mvi_merged_video_type[atlasIdx] | u(3) |
| } | |

| atlas_frame_tile_information(){ | Descriptor |
|---|---|
|     afti_single_tile_in_atlas_frame_flag | u(1) |
|     if(!afti_single_tile_in_atlas_frame_flag){ | |
|         afti_uniform_partition_spacing_flag | u(1) |
|         if(afti_uniform_partition_spacing_flag){ | |
|             afti_partition_cols_width_minus1 | ue(v) |
|             afti_partition_rows_height_minus1 | ue(v) |
|         } else { | |
|             afti_num_partition_columns_minus1 | ue(v) |
|             afti_num_partition_rows_minus1 | ue(v) |
|             for( i = 0;i < afti_num_partition_columns_minus1; i++) | |
|                 afti_partition_columns_width_minus1[i] | ue(v) |
|             for( i = 0;i < afti_num_partition_rows_minus1; i++) | |
|                 afti_partition_row_height_minus1[i] | ue(v) |
|         } | |
|         afti_single_partition_per_tile_flag | ue(1) |
|         if( !afti_single_partition_per_tile_flag){ | |
|             afti_num_tiles_in_atlas_frame_minus1 | ue(v) |
|             for( i = 0;i < afti_num_tile_in_atlas_frame_minus1 + 1; i++){ | |
|                 afti_top_left_partition)idx[i] | u(v) |
|                 afti_bottom_right_partition_column_offset[i] | ue(v) |
|                 afti_bottom_right_partition_row_offset[i] | ue(v) |
|             } | |
|         } | |
|         else | |
|             afti_num_tiles_in_atlas_frame_minus1 = NumPartitionsInAtlasFrame-1 | |
|         } | |
|     } | |
|     else | |
|         afti_num_tiles_in_atlas_frame_minus1 = 0 | |
|     if(asps_auxiliary_video_enabled_flag){ | |
|         afti_auxiliary_video_tile_row_width_minus1 | ue(v) |
|         for( i = 0;1 < afti_num_tiles_in_atlas_frame_minus1 + 1; i++ ) | |
|             afti_auxiliary_video_tile_row_height[i] | ue(v) |
|     } | |
|     afti_signalled_tile_id_flag | u(1) |
|     if(afti_signalled_tile_id_flag){ | |
|         afti_signalled_tile_id_length_minus1 | ue(v) |
|         for( i = 0;i < afti_num_tiles_in_atlas_frame_minus1 + 1; i++ ){ | |
|             afti_tile_id[i] | u(v) |
|             TileIdToIndex[ afti_tile_id[i]] = 1 | |
|             TileIndexToId[i] = afti_tile_id[i] | |
|         } | |
|     } | |
|     else | |
|         for( i = 0;i < afti_num_tiles_in_atlas_frame_minus1 + 1; i++){ | |
|             afti_tile_id[i] = 1 | |
|             TileIdToIndex[i] = 1 | |
|             TileIndexToid[i] = 1 | |
|         } | |
| } | |

| | |
|---|---|
| if( asps_miv_extension_flag){ | |
|     afti_merged_atlas_flag | u(1) |
|     afti_merged_atlas_mandatory_flag | |
|     if( afti_merged_atlas_flag){ | |
|         for(i = 0;i < afti_num_tiles_in_atlas_frame_minus1 + 1;i++){ | |
|             afti_tile_type[i] | ue(v) |
|         } | |
|         for(i = 0;i < afti_num_tiles_in_atlas_frame_minus1 + 1;i++){ | |
|             afti_tile_atlas_id[i] | u(6) |
|         } | |
|         for(i = 0;i < afti_num_tiles_in_atlas_frame_minus1 + 1;i++){ | |
|             afti_tile_group_id[i] | u(v) |
|         } | |
|         afti_signalled_tile_orientation_flag | u(1) |
|         if(afti_signalled_tile_orientation_flag){ | |
|             for(i = 0;i < afti_num_tiles_in_atlas_frame_minus1 + 1;i++){ | |
|                 afti_tile_orientation_index[i] | u(v) |
|             } | |
|         } | |
|     } | |
| } | |

METHOD OF PROCESSING IMMERSIVE VIDEO AND METHOD OF PRODUCING IMMERSIVE VIDEO

CROSS REFERENCE TO RELATED APPLICATION

The present application claims priority to Korean Patent Application Nos. 10-2021-0064693 filed 05.20.2021, Korean Patent Application Nos. 10-2020-0068653 filed 6 May 2020, Korean Patent Application Nos. 10-2020-0074169 filed 06.18.2020, Korean Patent Application Nos. 10-2020-0075557 filed 06.22.2020, Korean Patent Application Nos. 10-2020-0136746 filed 10.21.2020, the entire contents of which is incorporated herein for all purposes by this reference.

BACKGROUND OF THE INVENTION

1. Field of the Invention

The present application relates to a method for processing and producing immersive video that supports motion parallax for rotation and translation.

2. Description of the Related Art

The virtual reality service is evolving for providing a service that maximizes the sense of immersion and realism by generating omnidirectional videos in the form of real-life or computer graphics (CG) and playing them on HMD and smartphones. Currently, it is known that HMD is required to support 6 Degrees of Freedom (DoF) in order to reproduce natural and immersive omnidirectional video. 6DoF video should provide free video in six directions, including (1) left and right rotation, (2) up and down rotation, (3) left and right movement, (4) up and down movement through the HMD screen. However, currently, most of the omnidirectional video based on real images only support rotational motion. Therefore, research on fields such as obtaining and reproduction technology for 6DoF omnidirectional video is actively ongoing.

SUMMARY OF THE INVENTION

An object of the present disclosure is to provide a method of merging a plurality of atlases into one atlas.

In addition, another object of the present disclosure is to provide a configuration information generation method according to generation of a merged atlas.

The technical problems solved by the present disclosure are not limited to the above technical problems and other technical problems which are not described herein will become apparent to those skilled in the art from the following description.

An immersive video processing method according to the present disclosure includes classifying view images into a basic image and an additional image, performing pruning with respect to view images by referring to a result of classification, generating atlases based on a result of pruning, generating a merged atlas by merging the atlases into one atlas, and generating configuration information of the merged atlas.

In the immersive video processing method according to the present disclosure, each of the atlases configuring the merged atlas may be treated as an independent tile.

In the immersive video processing method according to the present disclosure, the configuration information may include number information indicating the number of atlases in the merged atlas and position information for specifying a position of each of the atlases.

In the immersive video processing method according to the present disclosure, the configuration information may include type information of each of the atlases.

In the immersive video processing method according to the present disclosure, the merged atlas may be generated by merging only the same type of atlases.

In the immersive video processing method according to the present disclosure, the merged atlas may be generated by merging only atlases belonging to the same group.

The features briefly summarized above with respect to the present disclosure are merely exemplary aspects of the detailed description below of the present disclosure, and do not limit the scope of the present disclosure.

BRIEF DESCRIPTION OF THE DRAWINGS

The above and other objects, features and other advantages of the present disclosure will be more clearly understood from the following detailed description taken in conjunction with the accompanying drawings, in which:

FIG. 12 is a view showing an example of generating a merged atlas composed of the same type of atlases;

FIG. 13 is a view showing an example of generating an essential type merged atlas and an additional type merged atlas;

FIGS. 14A and 14B are view showing examples of independently generating a merged atlas for each group;

FIG. 16 is a view showing an example of disposing data of a basic image and data of an additional image in a separate spatial region;

FIG. 17 is a view showing a v3c_parameter_set structure including information related to a merged atlas;

FIG. 18 is a view showing a merged_video_information structure including information related to a merged atlas;

FIG. 19 is a view showing an atlas_frame_tile_information structure including tile partitioning information of an atlas; and FIG. 20 is a view showing elements including merged atlas information corresponding to each tile.

DESCRIPTION OF THE PREFERRED EMBODIMENTS

Figure 1:
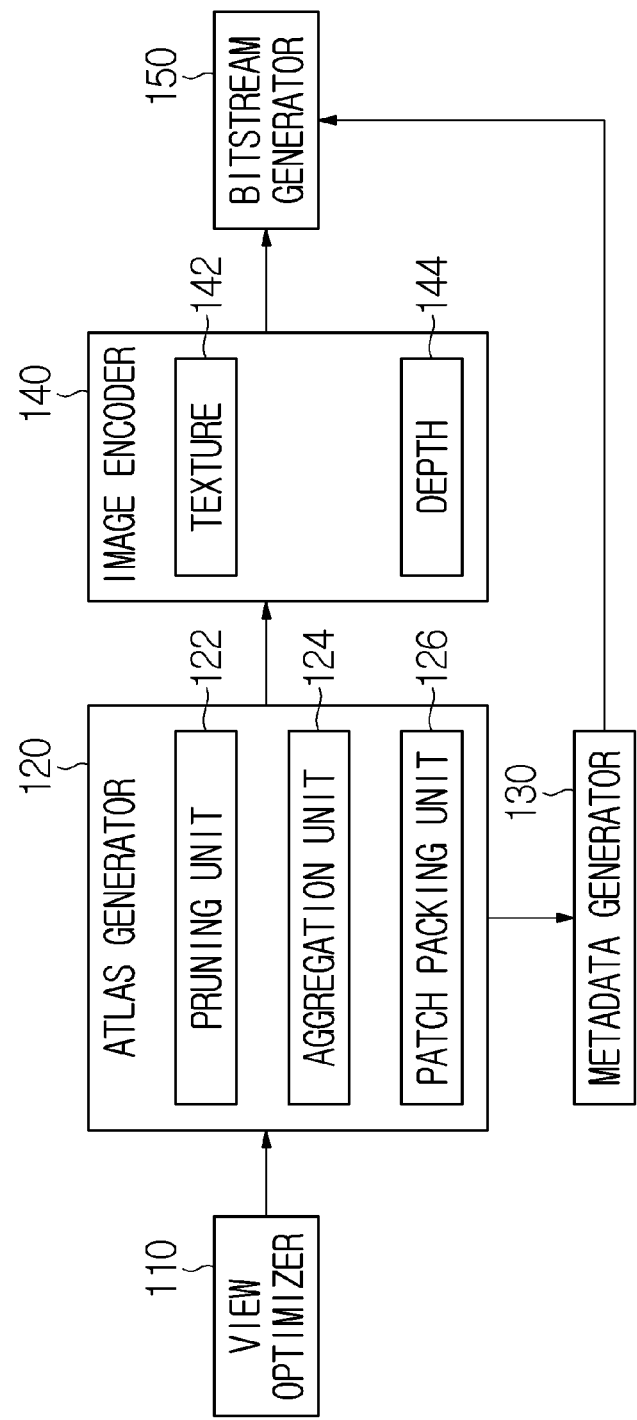
FIG. 1 is a block diagram of an immersive video processing apparatus according to an embodiment of the present disclosure.

A variety of modifications may be made to the present disclosure and there are various embodiments of the present disclosure, examples of which will now be provided with reference to drawings and described in detail. However, the present disclosure is not limited thereto, although the exemplary embodiments can be construed as including all modifications, equivalents, or substitutes in a technical concept and a technical scope of the present disclosure. The similar reference numerals refer to the same or similar functions in various aspects. In the drawings, the shapes and dimensions of elements may be exaggerated for clarity. In the following detailed description of the present disclosure, references are made to the accompanying drawings that show, by way of illustration, specific embodiments in which the disclosure may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present disclosure, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present disclosure are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present disclosure, if not departing from the essence of the present disclosure.

The terms used in the present specification are merely used to describe particular embodiments, and are not intended to limit the present disclosure. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present disclosure or the scope of the present disclosure.

In addition, some of constituents may not be indispensable constituents performing essential functions of the present disclosure but be selective constituents improving only performance thereof. The present disclosure may be implemented by including only the indispensable constitutional parts for implementing the essence of the present disclosure except the constituents used in improving performance. The structure including only the indispensable constituents except the selective constituents used in improving only performance is also included in the scope of the present disclosure.

Hereinafter, embodiments of the present disclosure will be described in detail with reference to the accompanying drawings. In describing exemplary embodiments of the present specification, well-known functions or constructions will not be described in detail since they may unnecessarily obscure the understanding of the present disclosure. The same constituent elements in the drawings are denoted by the same reference numerals, and a repeated description of the same elements will be omitted.

An immersive video means an image whose viewport may be dynamically changed when a user's viewing position is changed. In order to implement an immersive video, a plurality of input images is required. Each of the plurality of input images may be referred to as a source image or a view image.

The immersive video may be classified as three degrees of freedom (3DoF), 3DoF+, Windowed-6DoF or 6DoF type. A 3DoF based immersive video may be implemented using only a texture image. In contrast, in order to render an immersive video including depth information, such as 3DoF+ or 6DoF, not only a texture image but also a depth image is required.

Assume that embodiments described below are for immersive video processing including depth information, such as 3DoF+ and/or 6DoF. In addition, assume that a view image is composed of a texture image and a depth image.

FIG. 1 is a block diagram of an immersive video processing apparatus according to an embodiment of the present disclosure.

Referring to FIG. 1, the immersive video processing apparatus according to the present disclosure may include a view optimizer 110, an atlas generator 120, a metadata generator 130, an image encoder 140 and a bitstream generator 150.

The immersive video processing apparatus receives multiple pairs of videos, camera internal variable and camera external variables and encode an immersive video. Here, the multiple pairs of videos include a texture video (attribute component) and a depth video (geometry component). The pairs may have different views. Therefore, a pair of input videos may be referred to as a view image. The view images may be distinguished by indices. In this case, an index allocated to each view image may be referred to as a view or view index.

The camera internal variables include a focal distance and a position of a main point and the camera external variables include a camera position and a direction. The camera internal variables and the camera external variables may be treated as camera parameters or view parameters.

The view optimizer 110 divides view images into a plurality of groups. By dividing the view images into a plurality of groups, an independent encoding process may be performed for each group. For example, view images captured by N spatially consecutive cameras may be classified into one group. Therefore, view images with relatively coherent depth information may be grouped into one group and, therefore, rendering quality may be improved.

In addition, by removing dependency of information between groups, a spatial random access service for selectively fetching only information on a region viewed by a user and performing rendering may be enabled.

Whether the view images are divided into the plurality of groups may be optional.

The view optimizer 110 classifies view images into a basic image and an additional image. The basic image indicates a view image with highest pruning priority, which is not pruned, and the additional image indicates a view image with lower pruning priority than the basic image.

The view optimizer 110 may determine at least one of the view images as a basic image. View images which are not selected as the basic image may be classified as additional images.

The view optimizer 110 may determine the basic image in consideration of a view position of the view image. For example, a view image whose view position is a center among the plurality of view images may be selected as a basic image.

Alternatively, the view optimizer 110 may select a basic image based on a camera parameter. Specifically, the view optimizer 110 may select a basic image based on at least one of a camera index, camera priority, a camera position or whether a camera is in a region of interest.

For example, at least one of a view image with a smallest camera index, a view image with a largest camera index, a view image with the same camera index as a predefined value, a view image captured through a camera with highest priority, a view image captured through a camera with lowest priority, a view image captured through a camera at a predefined position (e.g., a center position) or a view image captured through a camera in a region of interest may be determined as a basic image.

Alternatively, the view optimizer 110 may determine the basic image based on quality of the view images. For example, a view image with highest quality among the view images may be determined as a basic image.

Alternatively, the view optimizer 110 may determine a degree of data overlapping between the view images and then determine a basic image in consideration of an overlap data ratio with the other view images. For example, a view image with a highest overlap data ratio with the other view images or a view image with a lowest overlap data ratio with the other view images may be determined as a view image.

A plurality of view images may be set as a basic image.

The atlas generator 120 generates a pruning mask by performing pruning. In addition, a patch is extracted using the pruning mask and an atlas is generated by combining the basic image and/or the extracted patch.

The generated atlas may be composed of a texture atlas and a depth atlas. The texture atlas indicates an image in which a basic texture image and/or texture patches are combined, and the depth atlas indicates an image in which a basic depth image and/or depth patches are combined.

The atlas generator 120 may include a pruning unit 122, an aggregation unit 124 and a patch packing unit 126.

The pruning unit 122 performs pruning with respect to the additional image based on pruning priority. Specifically, pruning for the additional image may be performed using a reference image with higher pruning priority than the additional image.

The reference image includes a basic image. In addition, the reference image may further include another additional image according to the pruning priority of the additional image.

It may be selectively determined whether the additional information may be used as the reference image. For example, when the additional image is set not to be used as the reference image, only the basic image may be set as the reference image.

On the other hand, when an additional image is set to be available as a reference image, another additional image with higher pruning priority than the basic view and the additional image may be set as a reference image.

Through the pruning process, overlapping data between the additional image and the reference image may be removed. Particularly, through a warping process based on a depth video, overlapping data between the additional images and a reference image may be removed. For example, the depth values between the additional image and the reference image are compared and, when a difference thereof is equal to or less than a threshold value, the corresponding pixel may be determined as the overlapping data.

As a result of performing pruning, a pruning mask including information whether each pixel in the additional image is valid or invalid may be generated. The pruning mask may be a binary video indicating whether each pixel in the additional image is valid or invalid. For example, in the pruning mask, a pixel determined as overlapping data of a reference image may have a value of 0 and a pixel determined as non-overlapping data of a reference image may have a value of 1.

The non-overlapped region may have a shape other than a rectangular shape, but the patch is limited to a rectangular shape. Therefore, the patch may include not only a valid region but also an invalid region. Here, the valid region means a region composed of non-overlapping pixels between the additional image and the reference image. That is, the valid region represents a region including data which is included in the additional image but is not included in the reference image. The invalid region means a region composed of overlapping pixels between the additional image and the reference image. A pixel/data included in the valid region may be referred to as a valid pixel/valid data, and a pixel/data included in the invalid region may be referred to as an invalid pixel/invalid data.

The aggregation unit 124 merges pruning masks generated in units of frames in units of intra-periods.

In addition, the aggregation unit 124 extracts a patch from a merged pruning mask video through a clustering process. Specifically, a rectangular region including valid data in the merged pruning mask video may be extracted as a patch. Regardless of the shape of the valid region, a patch having a rectangular shape is extracted and the patch extracted from the valid region having a non-rectangular shape may include not only valid data but also invalid data.

In this case, the aggregation unit 124 may subdivide an L-shaped or C-shaped patch for reducing encoding efficiency. Here, the L-shaped patch indicates that distribution of a valid region has an L-shape and the C-shaped patch indicates that distribution of a valid region has a C-shaped.

When the distribution of the valid region has an L-shape or a C-shape, a region occupied by an invalid region in a patch is relatively large. Therefore, by dividing the L-shaped or C-shaped patch into a plurality of patches, it is possible to improve encoding efficiency.

For an unpruned view image, an entire view image may be treated as a patch. Specifically, an entire 2D image in which the unpruned view image is deployed in a predetermined projection format may be set as a patch. The projection format may include at least one of an equirectangular projection format (ERP), a cube-map or a perspective projection format.

Here, the unpruned view image means a basic image with highest pruning priority. Alternatively, an additional image in which there is no overlapping data with the basic image and the reference image may be defined as an unpruned view image. Alternatively, regardless of whether there is overlapping data with the reference image, an additional image arbitrarily excluded from an object to be pruned may be defined as an unpruned view image. That is, even an additional image in which there is overlapping data with the reference image may be defined as an unpruned view image.

The packing unit 126 may pack the patch into a rectangular video. During packing the patch, modification such as size change, rotation or flipping of the patch may be involved. A video packed with patches may be defined as an atlas.

Specifically, the packing unit 126 may generate a texture atlas by packing a basic texture image and/or texture patches and generate a depth atlas by packing a basic depth image and/or depth patches.

The entire basic image may be treated as one patch. That is, the basic image may be packed into an atlas without change. When the entire image is treated as one patch, the patch may be referred to as a complete view or a complete patch.

The number of atlases generated by the atlas generator 120 may be determined based on at least one of the arrangement structure of a camera rig, accuracy of a depth map or the number of view images.

The metadata generator 130 generates metadata for image production. The metadata may include at least one of camera related data, pruning related data, atlas related data or patch related data.

The pruning related data includes information for determining pruning priority of view images. For example, at least one of a flag indicating whether a view image is a root node or a flag indicating whether a view image is a leaf node may be encoded. The root node indicates a view image (i.e., a basic image) with highest pruning priority and the leaf node indicates a view image with lowest pruning priority.

When the view image is not a root node, a parent node index may be further encoded. The parent node index may represent the image index of a view image which is a parent node.

Alternatively, when the view image is not a leaf node, a child node index may be further encoded. The child node index may represent the image index of a view image which is a child node.

Atlas related data may include at least one of size information of an atlas, information on the number of atlases, information on priority of atlases, or flag indicating whether an atlas includes a complete view. The size of the atlas may include at least one of size information of a texture atlas and size information of a depth atlas. In this case, a flag indicating whether the size of the depth atlas is equal to that of the texture atlas may be additionally encoded. When the size of the depth atlas is different from that of the texture atlas, reduction ratio information (e.g., scaling related information) of the depth atlas may be additionally encoded. The atlas related information may be included in a "view parameter list" item in a bitstream.

For example, a syntax geometry_scale_enabled_flag indicating whether reduction of the depth atlas is enabled may be encoded/decoded. The value of the syntax geometry_scale_enabled_flag being 0 indicates that reduction of the depth atlas is not enabled. In this case, the depth atlas has the same size as the texture atlas.

The value of the syntax geometry_scale_enabled_flag being 1 indicates that reduction of the depth atlas is enabled. In this case, information for determining the reduction ratio of the depth atlas may be additionally encoded/decoded. For example, the syntax geometry_scaling_factor_x indicating the horizontal reduction ratio of the depth atlas and the syntax geometry_scaling_factor_y indicating the vertical reduction ratio of the depth atlas may be additionally encoded/decoded.

In the immersive video output apparatus, information on the reduction ratio of the depth atlas may be decoded and then the reduced depth atlas may be reconstructed to an original size.

The patch related data includes the position and/or size of a patch in an atlas video, a view image, to which a patch belongs, and information for specifying the position and/or size of a patch in a view image. For example, at least one of position information indicating the position of the patch in the atlas video or size information indicating the size of the patch in the atlas video may be encoded. In addition, a source index for identifying a view image, from which a patch is derived, may be encoded. The source index represents the index of a view image which is an original source of a patch. In addition, position information indicating a position corresponding to a patch in a view image or size information indicating a size corresponding to a patch in a view image may be included in an "Atlas data" item in a bitstream.

The image encoder 140 encodes the atlas. When view images are classified into a plurality of groups, an atlas may be generated for each group. Therefore, image encoding may be independently performed for each group.

The image encoder 140 may include a texture video encoder 142 for encoding a texture atlas and a depth video encoder 144 for encoding a depth atlas.

The bitstream generator 150 generates a bitstream based on the encoded image data and meta data. The generated bitstream may be transmitted to an immersive video output apparatus.

Figure 2:
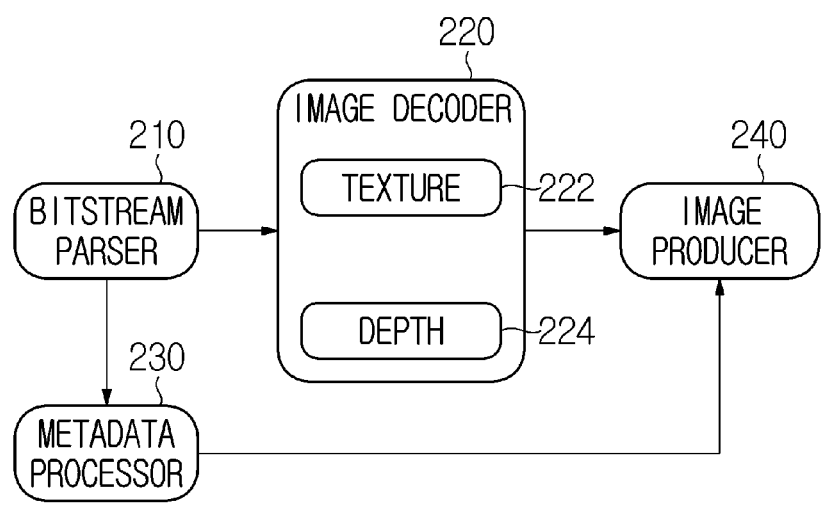
FIG. 2 is a block diagram of an immersive video output apparatus according to an embodiment of the present disclosure.

FIG. 2 is a block diagram of an immersive video output apparatus according to an embodiment of the present disclosure.

Referring to FIG. 2, the immersive video output apparatus according to the present disclosure may include a bitstream parser 210, an image decoder 220, a metadata processor 230 and an image producer 240.

The bitstream parser 210 parses video data and metadata from a bitstream. The video data may include data of an encoded atlas. When a spatial random access service is supported, only a partial bitstream including the viewing position of a user may be received.

The image decoder 220 decodes the parsed image data. The image decoder 220 may include a texture image decoder 222 for decoding a texture atlas and a depth image decoder 224 for decoding a depth atlas.

The metadata processor 230 unformats the parsed metadata.

The unformatted metadata may be used to produce a particular view image. For example, when user's movement information is input to the immersive video output apparatus, the metadata processor 230 may determine an atlas necessary for image production, patches necessary for image production and/or the position/size of the patches in the atlas, in order to reproduce a viewport image according to user's movement.

The image producer 240 may dynamically produce the viewport image according to the user's movement. Specifically, the image producer 240 may extract patches necessary to produce the viewport image from the atlas, using information determined by the metadata processor 230 according to user's movement. Specifically, the viewport image may be produced by extracting an atlas including information on a view image necessary to produce the viewport image and patches extracted from the view image in the atlas and synthesizing the extracted patches.

Figure 3:
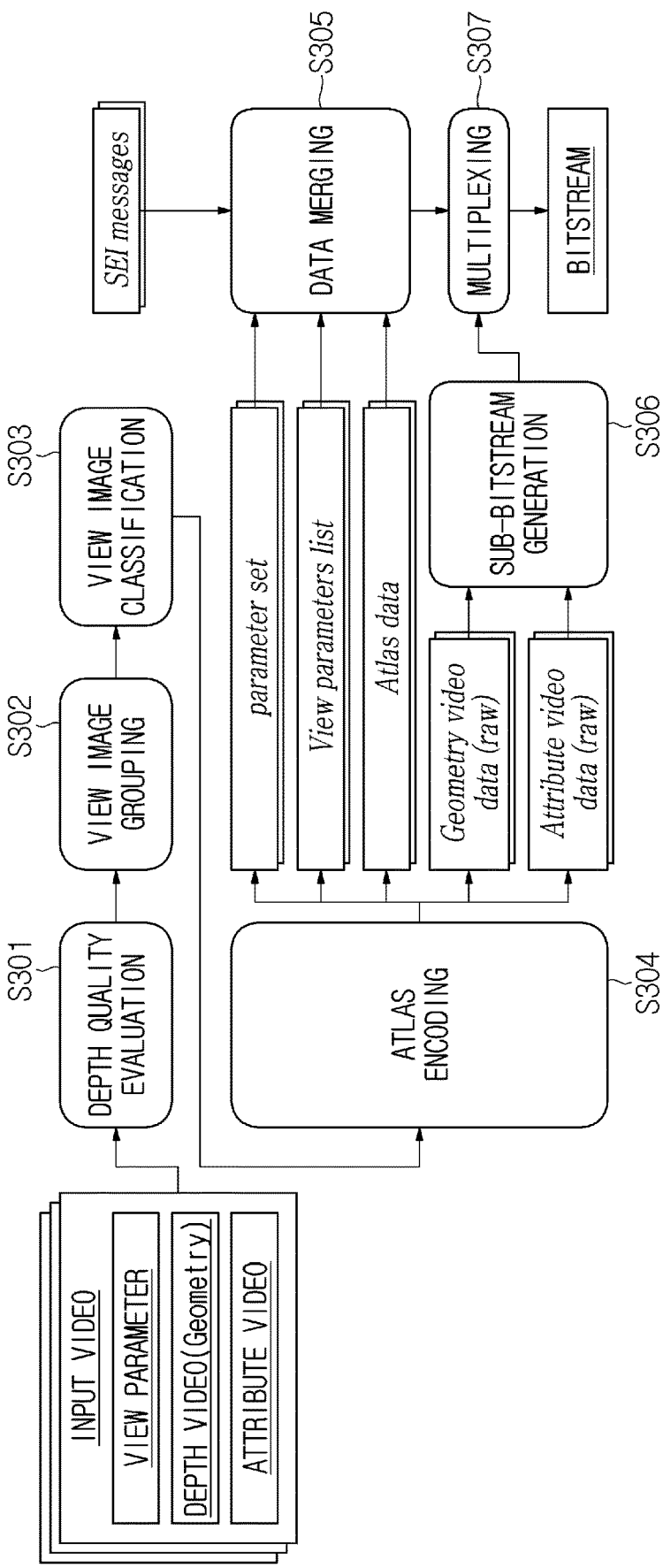
FIG. 3 is a flowchart of an immersive video processing method.
Figure 5:
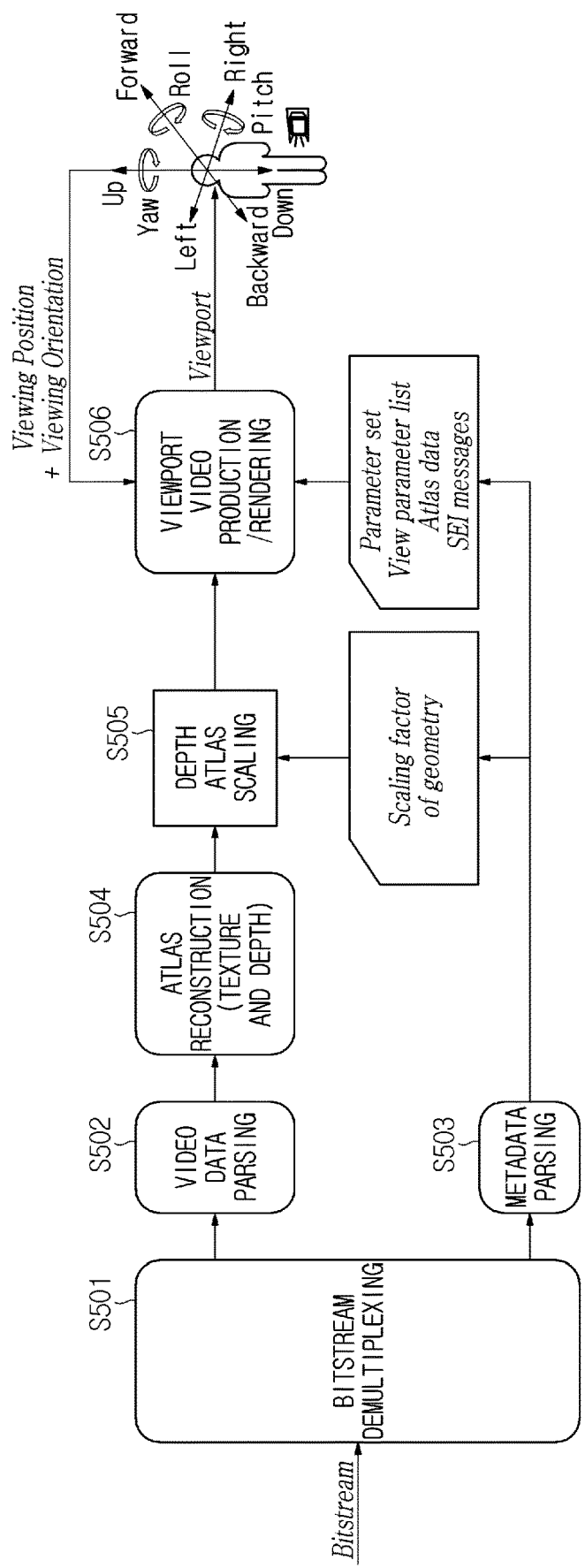
FIG. 5 is a flowchart of an immersive video output method.

FIGS. 3 and 5 are flowcharts illustrating an immersive video processing method and an immersive video output method.

In the following flowcharts, italic letters and underlines indicate input or output data for performing each step. In addition, in the following flowcharts, arrow indicates the processing order of each step. In this case, step without arrow may mean that temporal order of steps is not determined or the steps may be performed in parallel. In addition, the immersive video may be processed or output in order different from that shown in the following flowcharts.

The immersive video processing apparatus may receive at least one of a plurality of input videos, camera internal variables or camera external variables, and evaluate depth map quality through the received data (S301). Herein, the input videos may be composed of a pair of texture videos (attribute component) and a depth video (geometry component).

The immersive video processing apparatus may classify the input videos into a plurality of groups based on proximity of the positions of a plurality of cameras (S302). By classifying the input videos into the plurality of groups, pruning and encoding may be independently performed between adjacent cameras with a relatively coherent depth value. In addition, through the above process, a spatial random access service in which rendering is performed using only information on a region viewed by a user may be enabled.

However, steps S301 and S302 are optional and are not necessarily performed.

When the input videos are classified into the plurality of groups, the below-described procedures may be independently performed for each group.

The immersive video processing apparatus may determine the pruning priority of view images (S303). Specifically, the view images may be classified into basic images and additional images, and the pruning priority of the additional images may be set.

Figure 4:
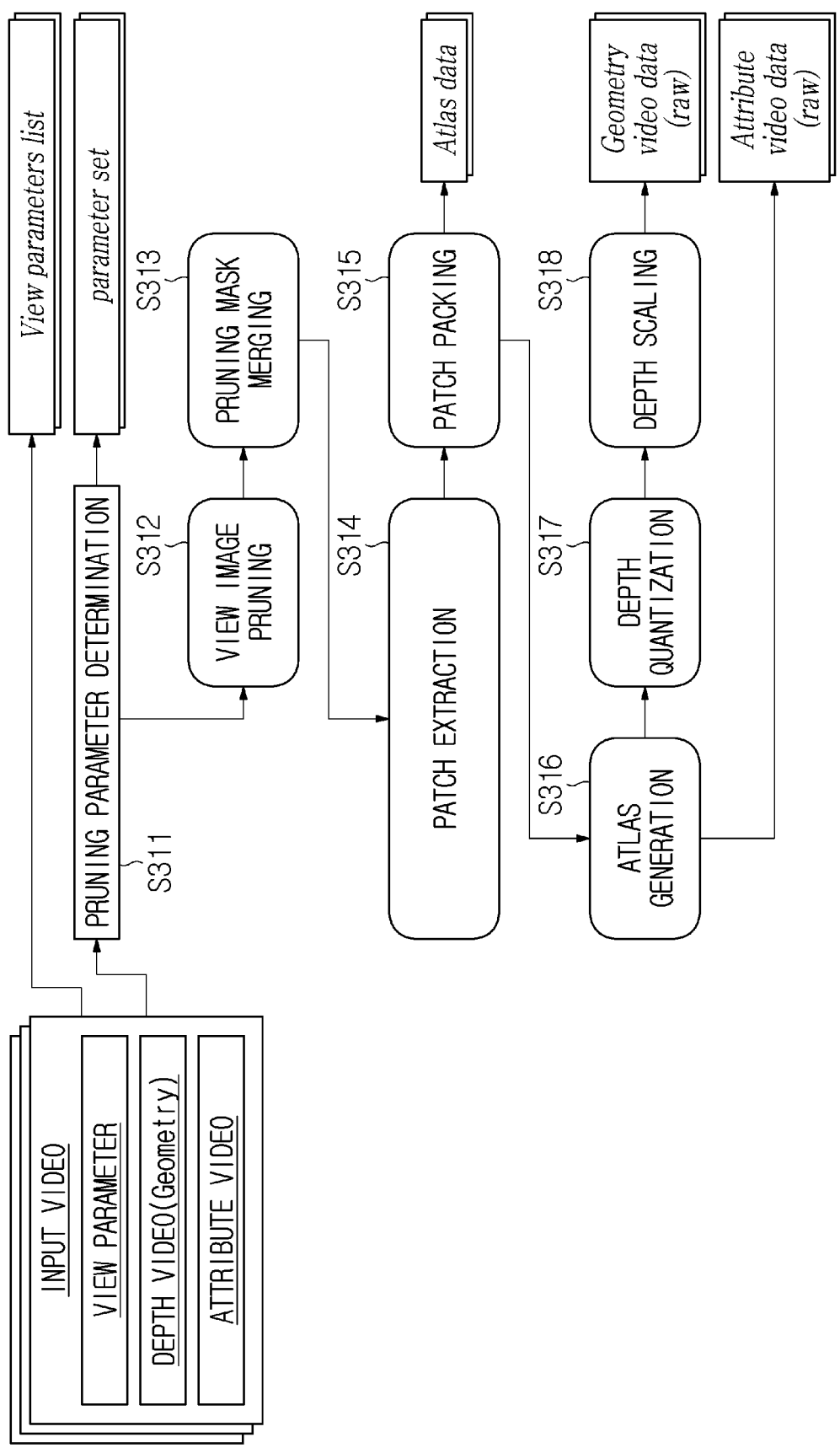
FIG. 4 is a flowchart of an atlas encoding process.

Thereafter, based on the pruning priority, an atlas may be generated and the generated atlas may be encoded (S304). The encoding process of the atlases is shown in FIG. 4 in detail.

Specifically, a pruning parameter (e.g., pruning priority, etc.) is determined (S311), and pruning may be performed with respect to the view images based on the determined pruning parameter (S312). As a result of performing pruning, a basic image with highest priority is maintained without change. In contrast, through pruning of the additional images, overlapping data between the additional images and a reference image is removed. Through a warping process based on a depth video, overlapping data between the additional images and a reference image may be removed.

As a result of performing pruning, pruning masks may be generated. When the pruning masks are generated, the pruning masks are merged in units of intra-periods (S313). In addition, using the merged pruning mask, patches may be extracted from a texture video and a depth video (S314). Specifically, the patches may be extracted by masking the merged pruning mask on texture videos and depth videos.

In this case, an entire unpruned view image (e.g., a basic image) may be treated as one patch.

Thereafter, the extracted patches are packed (S315) and atlases may be generated (S316). Specifically, a texture atlas and a depth atlas may be generated.

In addition, the immersive video processing apparatus may determine a threshold for determining validity/invalidity of a pixel based on the depth atlas (S317). For example, a pixel with a value in an atlas less than the threshold may correspond to an invalid pixel and a pixel with a value in the atlas equal to or greater than the threshold may correspond to a valid pixel. The threshold may be determined in units of videos or patches.

In order to reduce the amount of data, the size of the depth atlas may be reduced by a specific ratio (S318). When the size of the depth atlas is reduced, information on the reduction ratio of the depth atlas (e.g., a scaling factor) may be encoded. In the immersive video output apparatus, the reduced depth atlas may be reconstructed to an original size through the size of the texture atlas and the scaling factor.

Metadata generated in the atlas encoding process (e.g., a parameter set, a view parameter list or atlas data) and supplemental enhancement information (SEI) are merged (S305). In addition, each of the texture atlas and the depth atlas are encoded to generate a sub-bitstream (S306). In addition, the encoded metadata and the encoded atlas may be multiplexed to generate a single bitstream (S307).

The immersive video output apparatus demultiplexes the bitstream received from the immersive video processing apparatus (S501). As a result, video data, that is, atlas data and metadata, may be extracted (S502 and S503).

The immersive video output apparatus may reconstruct the atlas based on the parsed video data (S504). In this case, when the depth atlas is reduced by the specific ratio, related information may be obtained from the metadata and the depth atlas may be scaled to an original size (S505).

When user's movement occurs, an atlas required to produce a viewport video according to the user's movement may be determined based on the metadata, and patches included in the atlas may be extracted. The viewport video may be generated and rendered (S506). In this case, in order to synthesize the generated patches, the size/position information of each patch and a camera parameter may be used.

A video processing method proposed by the present disclosure will be described in greater detail based on the above description.

When the atlases are generated for each group and video attribute (for example, texture video and depth video), the number of atlases is excessively large and thus the number of required encoders and decoders is also greatly increased. When the number of encoders and decoders increases, it is difficult to provide a real-time/random access service due to temporal synchronization. In order to solve this, the present disclosure proposes an improved immersive video processing method and/or an improved immersive video output method.

Figure 6:
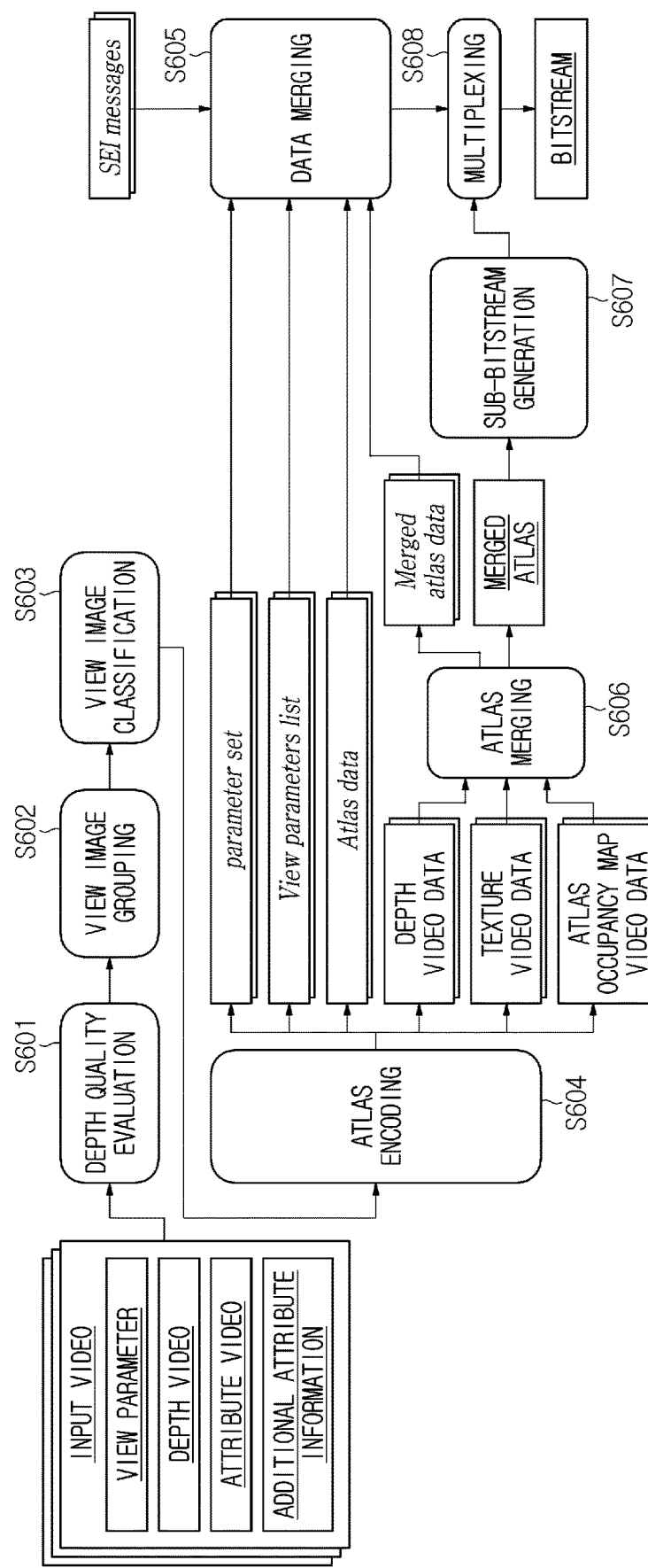
FIG. 6 is a flowchart of an improved immersive video processing method.
Figure 8:
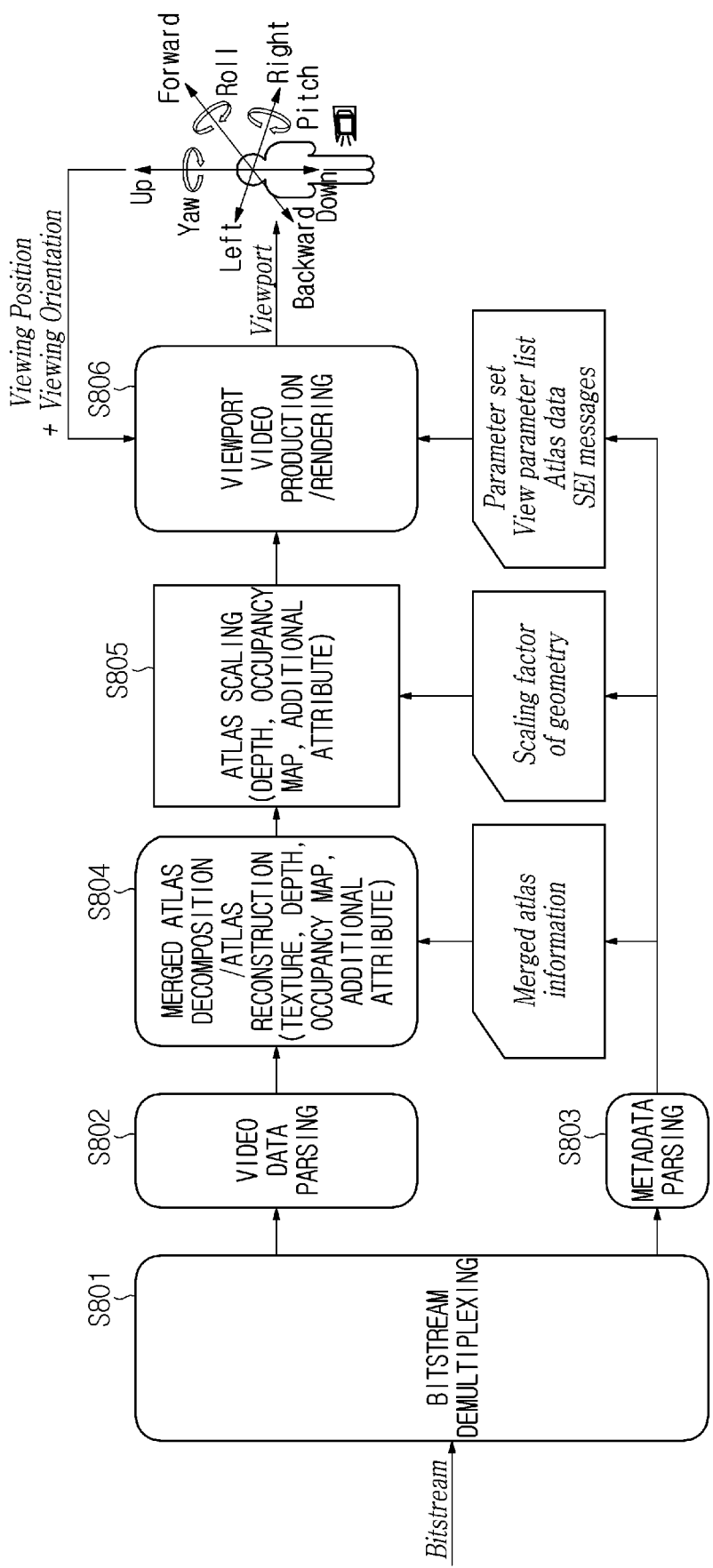
FIG. 8 is a flowchart of an improved immersive video output method.

FIGS. 6 and 8 are flowcharts of an improved immersive video processing method and an improved immersive video output method according to an embodiment of the present disclosure.

First, an object of this embodiment is to support not only 3DoF and 3DoF+ but also 6DoF type input video processing. The 3DoF+ type immersive video has a relatively narrower degree-of-freedom support range and a smaller number of views than the 6DoF type immersive video.

Figure 9A:
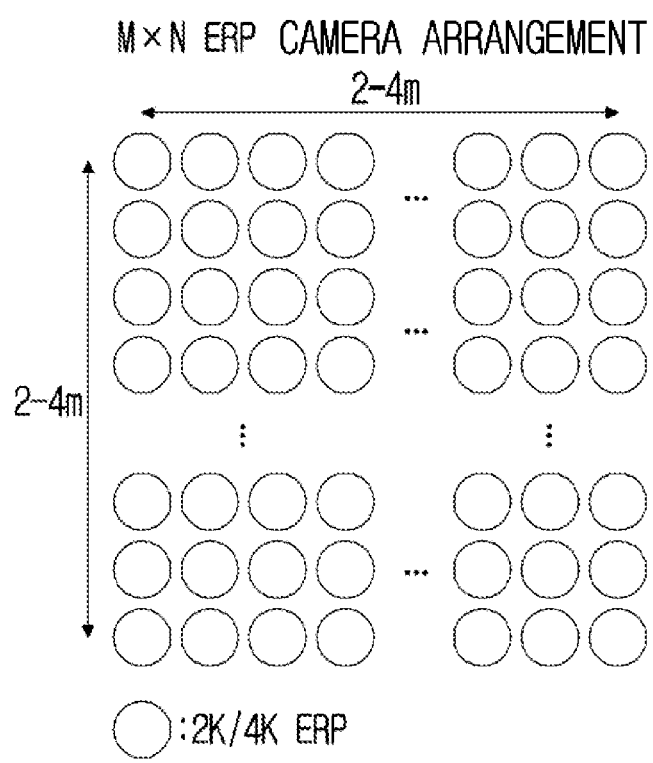
FIGS. 9A and 9B are view showing a camera arrangement structure for capturing a 6DoF type immersive video.
Figure 9B:
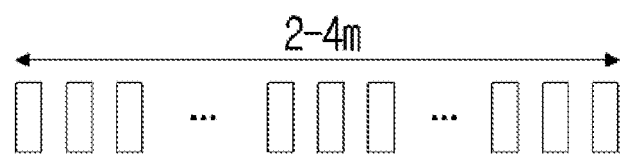

For example, FIGS. 9A and 9B are view showing a camera arrangement structure for capturing a 6DoF type immersive video.

As shown in the example of FIG. 9A, a plurality of cameras is arranged two-dimensionally (2D) (e.g., at an interval of 2 to 4 m in a vertical/horizontal direction) to configure a camera group, and as shown in the example of FIG. 9B, a plurality of camera groups may be arranged at a certain interval (e.g., at an interval of 2 to 4 m in a horizontal direction) to generate a 6DoF type immersive video.

In this case, specifically, omnidirectional videos (e.g., equirectangular projection (ERP) type videos) may be obtained through the 2D arranged cameras, thereby generating a 6DoF type immersive video.

By enabling the immersive video processing apparatus according to the present disclosure to process the 6DoF type immersive video, it is possible to process content with a relatively larger number of views and/or content with a larger distance between views compared to a conventional immersive video processing apparatus.

To this end, in the improved immersive video processing method according to the present disclosure, in addition to a texture video which is a kind of attribute information, additional attribute information (additional attribute component) may be received and processed as input. For example, if an existing immersive video processing apparatus processes only RGB texture data as attribute information, the immersive video processing apparatus according to the present disclosure may additionally process at least one of lighting, reflection, refraction or global illumination in addition to the RGB texture data.

By input of the additional attribute information, an atlas may be generated for each additional attribute. For example, at least one of an atlas for lighting, an atlas for reflection, an atlas for refraction or an atlas for global illumination may be additionally generated. The atlases for the additional attributes may be generated through the atlas encoding processes (S304 and S604).

Figure 7:
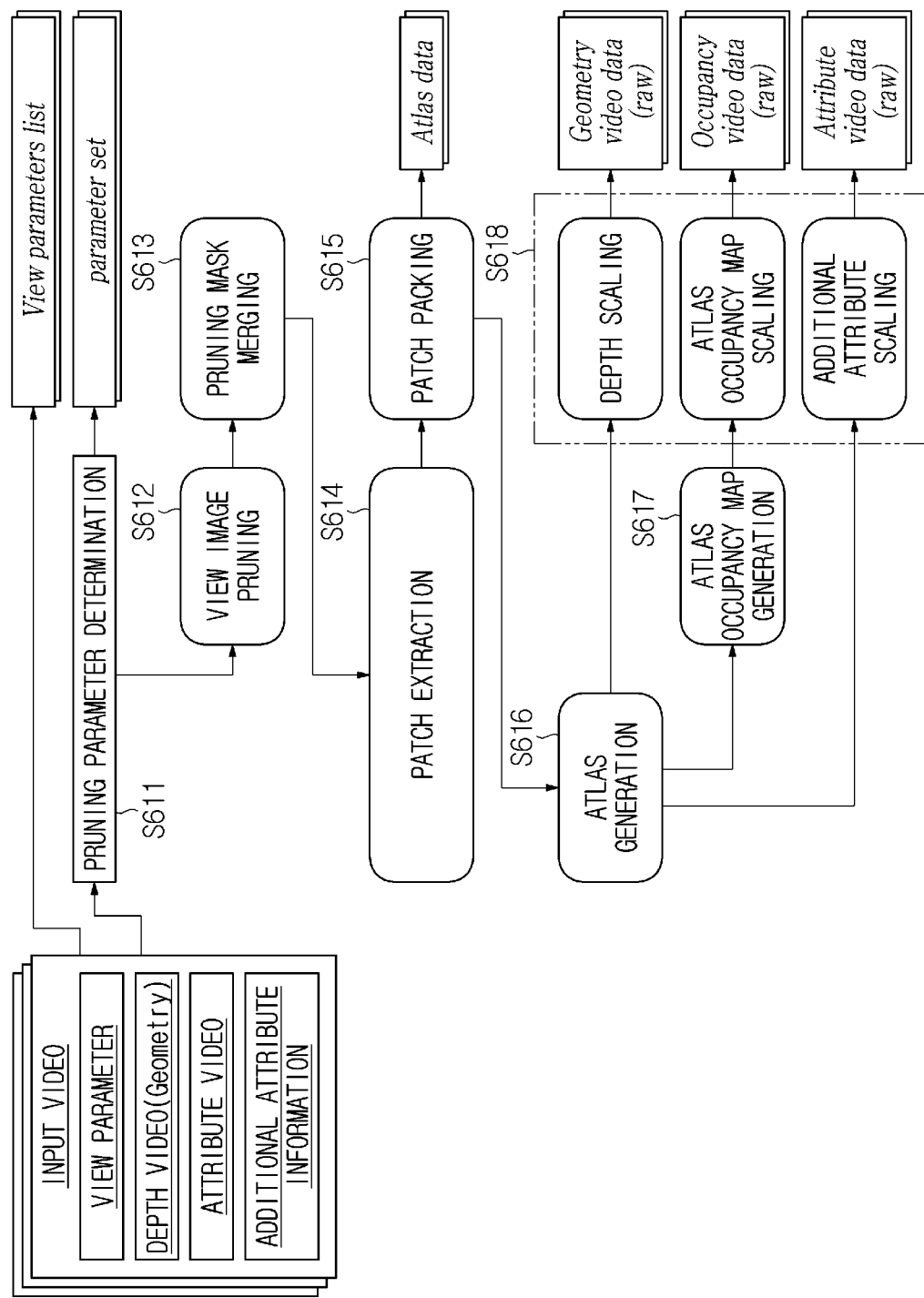
FIG. 7 is a flowchart of an improved atlas encoding process.

In describing the steps shown in FIGS. 6 to 8, a repeated description of steps overlapping those of FIGS. 3 to 5 will be omitted.

In the improved immersive video processing method according to the present disclosure, a depth quantization step S317 will be omitted. When validity/invalidity of a pixel is determined by applying a threshold, due to data loss generated in the encoding/decoding process of the depth atlas, validity/invalidity determination may be inaccurate and thus rendering quality may deteriorate.

In order to solve the above problem, the depth quantization step may be omitted and an atlas occupancy map generation step may be added (S617). The atlas occupancy map indicates a binary video indicating whether a pixel in an atlas is valid or invalid. For example, the value of the pixel in the atlas occupancy map being 0 indicates that the corresponding pixel of the pixel in the atlas is an invalid pixel, and the value of the pixel in the atlas occupancy map being 1 indicates that the corresponding pixel of the pixel in the atlas is a valid pixel.

Atlas occupancy maps may be additionally generated as much as the number of atlases. Therefore, the number of encoders necessary for the immersive video output apparatus may increase. In order to solve this problem, the size of the atlas occupancy map may be reduced by a specific ratio (S618). This is because the atlas occupancy map is a binary video composed of 0 and 1 and thus data loss is not significant even if the size of the atlas occupancy map is reduced.

Meanwhile, information on the reduction ratio of the atlas occupancy map may be encoded into metadata. Specifically, at least one of a flag indicating whether the atlas occupancy map is reduced compared to the depth atlas and encoded or the reduction ratio (e.g., scaling factor) of the atlas occupancy map may be encoded into metadata.

For example, a syntax occupancy_scale_enabled_flag indicating whether the atlas occupancy map is enabled to be reduced may be encoded/decoded. The value of the syntax occupancy_scale_enabled_flag being 0 indicates that the atlas occupancy map is not enabled to be reduced. In this case, the atlas occupancy map has the same size as the depth atlas.

The value of the syntax occupancy_scale_enabled_flag being 1 indicates that the atlas occupancy map is enabled to be reduced. In this case, information for determining the reduction ratio of the atlas occupancy map may be additionally encoded/decoded. For example, a syntax occupancy_scaling_factor_x indicating the horizontal reduction ratio of the atlas occupancy map and a syntax occupancy_scaling_factor_y indicating the vertical reduction ratio of the atlas occupancy map may be additionally encoded/decoded.

In the immersive video output apparatus, information on the reduction ratio of the atlas occupancy map may be decoded and then the reduced atlas occupancy map may be reconstructed to an original size.

In addition, compared to the text atlas, the additional attribute atlas may be reduced by a specific ratio (S618). Information on the reduction ratio of the additional attribute atlas may be encoded into metadata. Specifically, at least one of a flag indicating whether the additional attribute atlas is reduced compared than the texture atlas and is encoded or the reduction ratio of the additional attribute atlas may be encoded into metadata.

For example, a syntax attribute_scale_enabled_flag indicating whether the additional attribute atlas is enabled to be reduced may be encoded/decoded. The value of the syntax attribute_scale_enabled_flag being 0 indicates that the additional attribute atlas is not enabled to be reduced. In this case, the additional attribute atlas has the same size as the texture atlas.

The value of the syntax attribute_scale_enabled_flag being 1 indicates that the additional attribute atlas is enabled to be reduced. In this case, information for determining the reduction ratio of the additional attribute atlas may be additionally encoded/decoded. For example, a syntax attribute_scaling_factor_x indicating the horizontal reduction ratio of the additional attribute atlas and a syntax attribute_scaling_factor_y indicating the vertical reduction ratio of the additional attribute atlas may be additionally encoded/decoded.

In the immersive video output apparatus, information on the reduction ratio of the additional attribute atlas may be decoded and then the reduced additional attribute atlas may be reconstructed to an original size.

However, as in the above-described example, when atlases are generated for each group and/or component, the types and/or number of generated atlases is excessively large. In order to solve this problem, a plurality of atlases in a range supported by the encoder/decoder, such as high efficiency video coding (HEVC) or versatile video coding (VVC), may be merged into one atlas, thereby generating a merged atlas (S606).

Different types of atlases may be input to generate the merged atlas.

Figure 10:
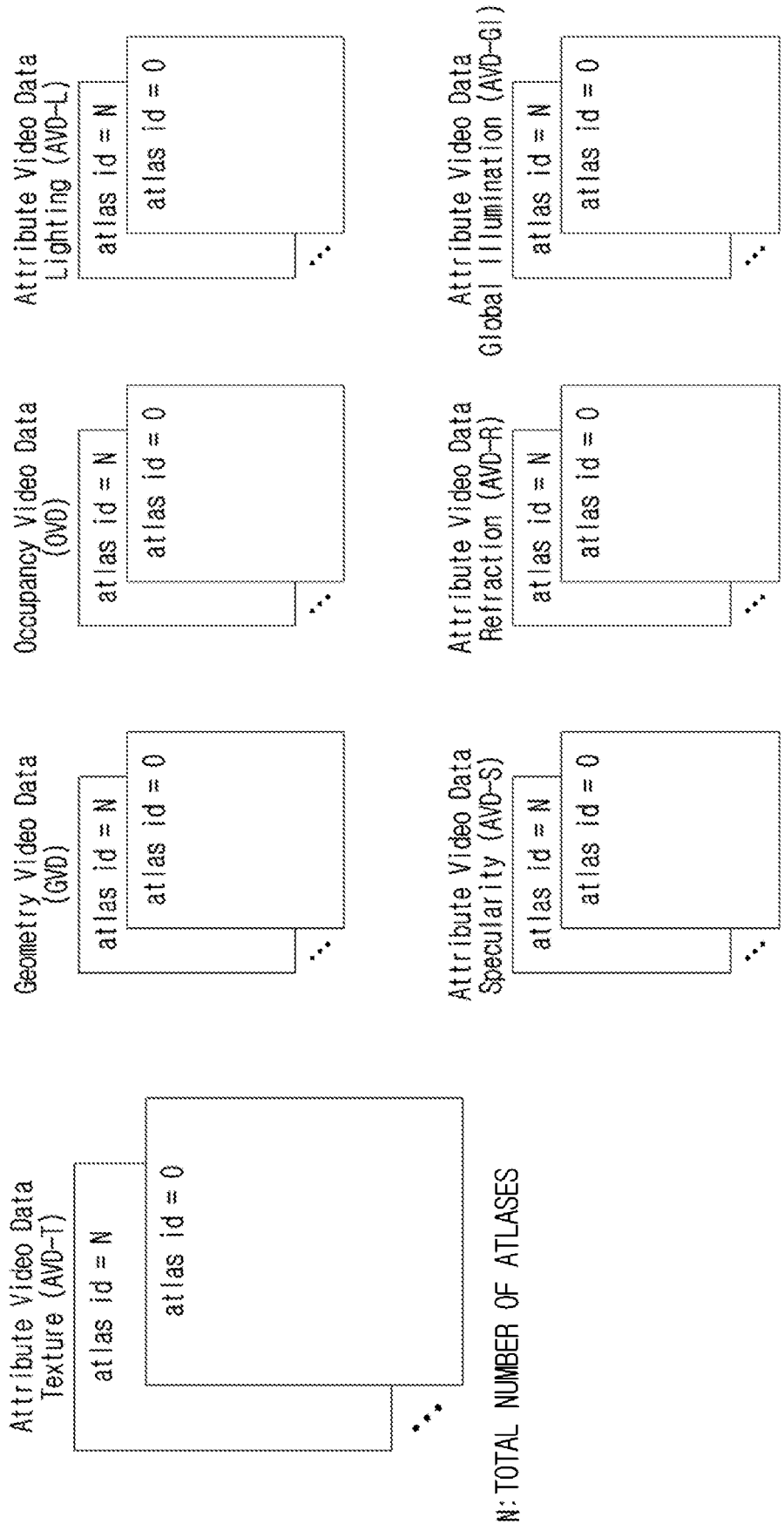
FIG. 10 is a view showing atlases input to generate a merged atlas.

FIG. 10 is a view showing atlases input to generate a merged atlas.

In FIG. 10, Attribute Video Data (AVD-T) indicates a texture atlas, Geometry Video Data (GVD) indicates a depth atlas, Occupancy Video Data (OVD) indicates an atlas occupancy map, Attribute Video Data Lighting (AVD-L) indicates a lighting atlas, Attribute Video Data Specularity (AVD-S) indicates a reflection atlas, Attribute Video Data Refraction (AVD-R) indicates a refraction atlas, and Attribute Video Data Global Illumination (AVD-GI) indicates a global illumination atlas.

The merged atlas may be generated using more types or fewer types of atlases than the example shown in FIG. 10.

The merged atlas may be generated in consideration of at least one of the size of the atlas, the atlas type or whether the atlas includes information essential for image reproduction.

Figure 11:
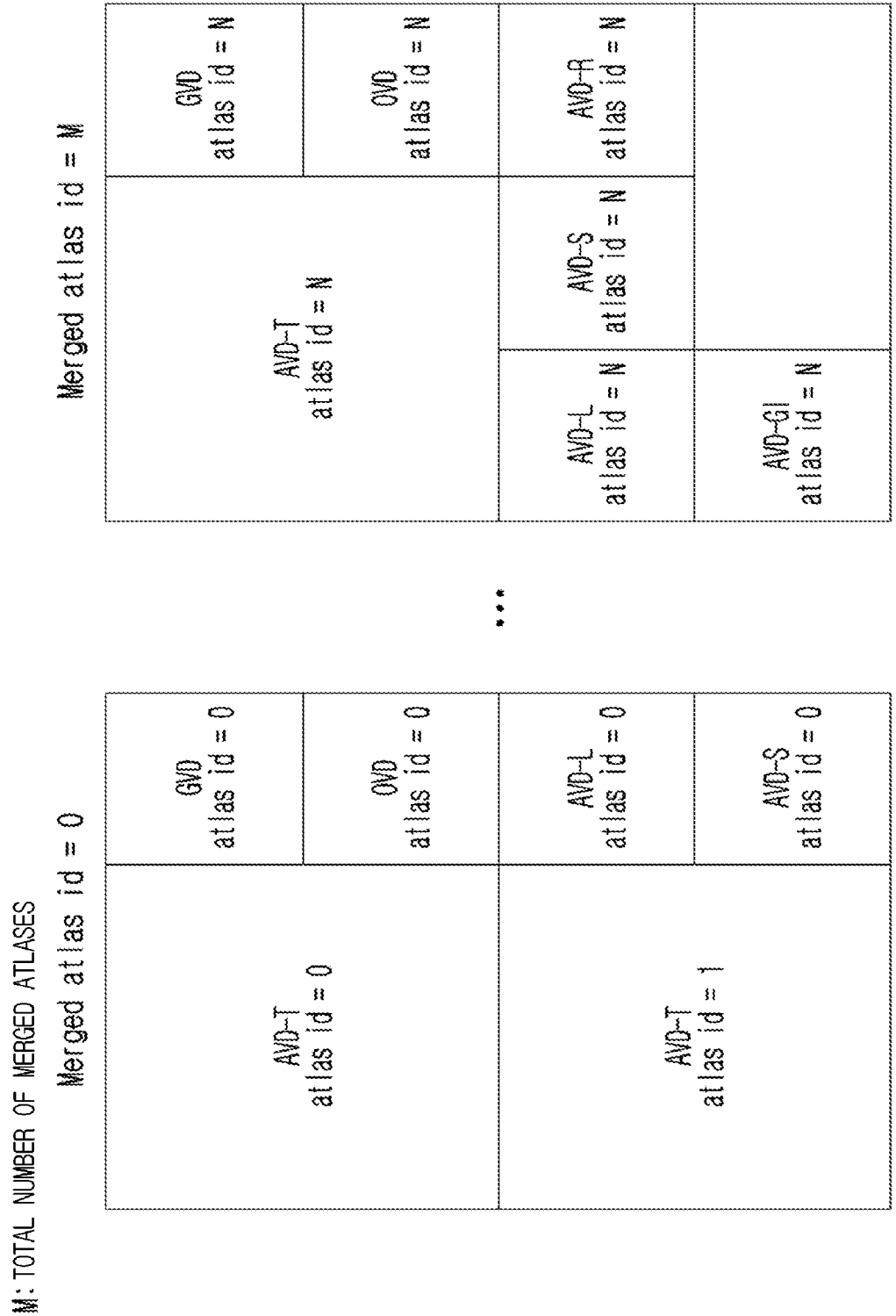
FIG. 11 is a view showing an example in which a plurality of atlases in a merged atlas is arranged in order of the size.

FIG. 11 is a view showing an example in which a plurality of atlases in a merged atlas is arranged in order of the size.

The merged atlas may be generated by arranging atlases from the largest to the smallest. For example, a largest atlas among the atlases may be disposed on the top left end of the merged atlas. The remaining atlases may be disposed on the right side and/or lower end of the largest atlas.

When the sizes of the atlases are the same, the arrangement order may be determined in consideration of an identifier (ID) assigned to the atlas or the atlas type. For example, an atlas having a low identifier may be set to be disposed on the upper end or left side of an atlas having a high identifier. In addition, the priority of different types of atlases may be set in order of a texture atlas, a depth atlas, an occupancy map, a lighting atlas, a reflection atlas, a refraction atlas and a lighting atlas.

Alternatively, the merged atlas may be generated by merging only the same type of atlases. That is, different types of atlases may be prohibited from being merged into one atlas.

Figure 12:
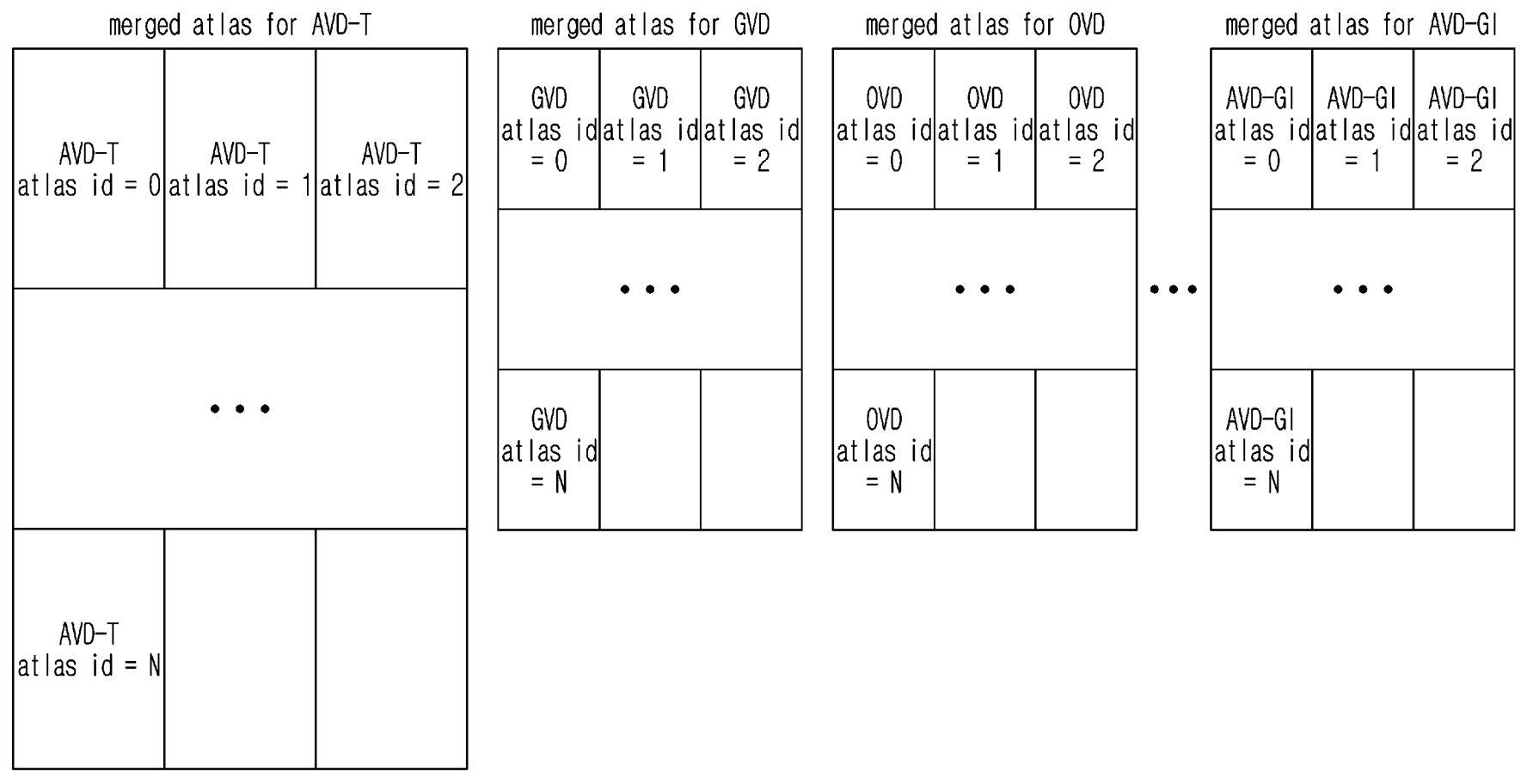

FIG. 12 is a view showing an example of generating a merged atlas composed of the same type of atlases.

As in the example shown in FIG. 12, a merged atlas obtained by merging texture atlases, a merged atlas obtained by merging depth atlases, a merged atlas obtained by merging atlas occupancy maps, a merged atlas obtained by merging lighting atlases, a merged atlas obtained by reflection atlases, a merged atlas obtained by refraction atlases and a merged atlas obtained by merging global illumination atlases may be generated, respectively.

In this case, the arrangement order of atlases in each merged atlas may be determined based on at least one of the atlas size or the identifier assigned to the atlas, as in the above-described example.

Alternatively, the atlases may be classified into a type essential for image reproduction and an additional type and then the merged atlas may be generated by referring to the result of classification. For example, merging of essential type atlases and merging of additional type atlases are enabled and an essential type atlas and an additional type atlas may be set not to be merged.

FIG. 13 is a view showing an example of generating an essential type merged atlas and an additional type merged atlas.

A texture atlas, a depth atlas and an atlas occupancy map essential for image reduction may be classified into an essential type, and the other atlases (e.g., the lighting atlas, the reflection atlas, the refraction atlas and the global illumination atlas) may be classified into an additional type.

The essential type merged atlas may be generated by merging only essential type atlases, and the additional type merged atlas may be generated by merging only additional type atlases.

In this case, the arrangement order of the atlases in each merged atlas may be determined based on at least one of the atlas size or the identifier assigned to the atlas, as in the above-described example.

Through classification of the essential type and the additional type, decoding priority of the merged atlases may be determined. For example, when decoders provided in the immersive video output apparatus are insufficient, only merged atlases composed of essential type atlases may be selectively transmitted and decoded.

Alternatively, merging of atlases may be enabled for a specific type among atlases and may not be enabled for the remaining type. For example, merging may not be enabled for the texture atlas, but merging may be enabled for at least one of the depth atlas, the occupancy map atlas or the additional attribute atlas. That is, the texture atlases are independently encoded/decoded, but the other types of atlases may be merged into a merged atlas and the merged atlas may be encoded/decoded.

When generating the merged atlas, in order to minimize an empty space in the merged atlas and arrange similar atlases as close as possible, processing of at least one of atlas rotation or inversion (e.g., up-down inversion or left-right inversion) may be performed. Herein, rotation may be performed in units of a multiple of 90 degrees.

When input videos are classified into a plurality of groups, a merged atlas may be independently generated for each group.

Figure 14A:
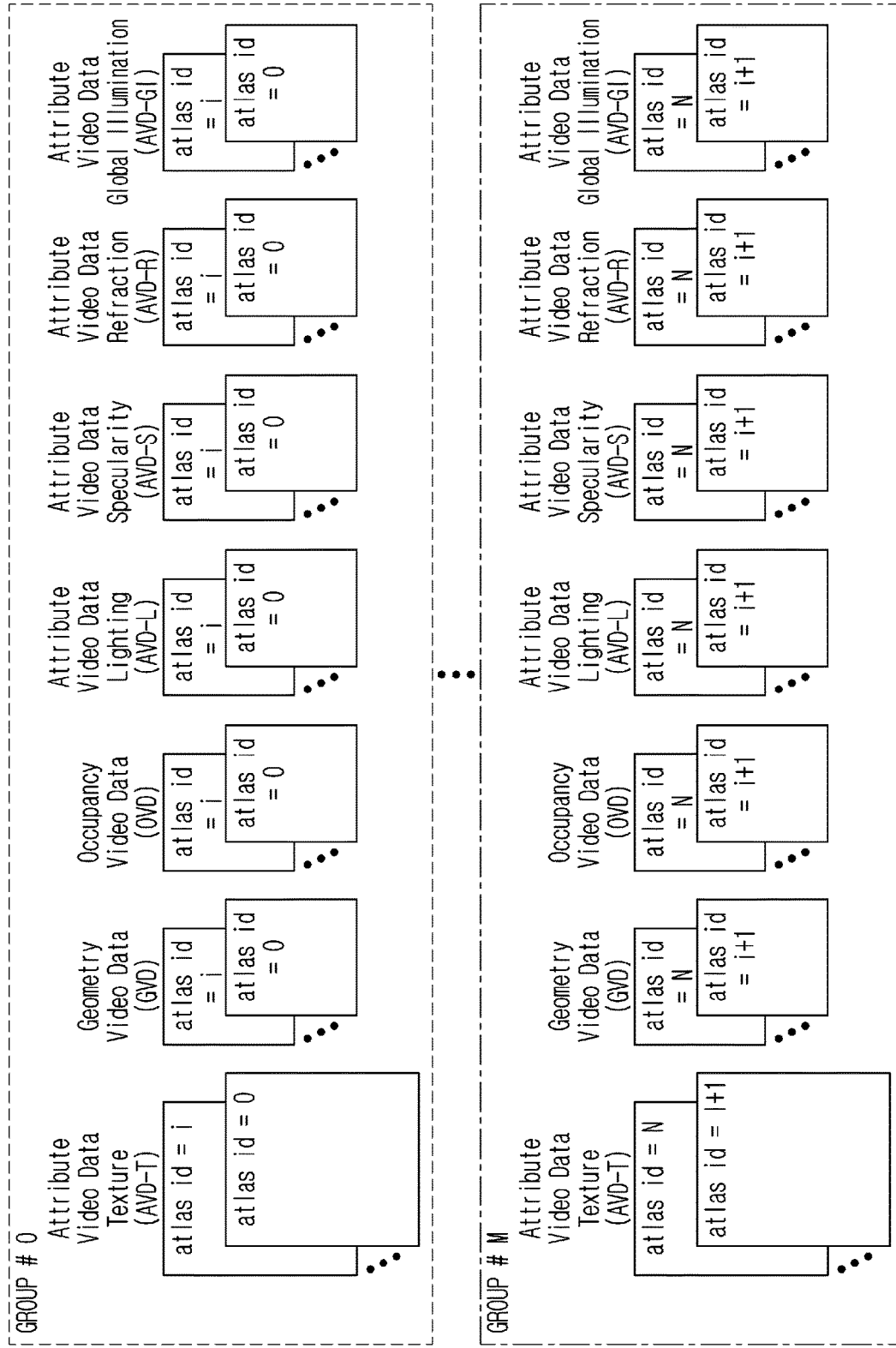

FIG. 14 is a view showing an example of independently generating a merged atlas for each group.

When N input videos are classified into a total of M groups, a step of generating a merged atlas may be performed for each of the M groups. That is, the merged atlas may be set not to include another group of atlases.

For example, as in the example shown in FIG. 14, when N input videos are divided into M groups, at least one merged atlas may be generated for each of the M groups.

By maintaining independency between groups when generating the merged atlas, a spatial random access service may be enabled. For example, when a viewer views a region belonging to group #K, only a merged atlas for group #K may be transmitted and decoded, thereby producing a video.

As another example, a merged atlas may be generated by merging merged atlases of a plurality of groups. For convenience of description, a merged atlas of each group may be referred to as a group atlas. That is, one merged atlas may be generated by merging a plurality of group atlases.

Figure 15A:
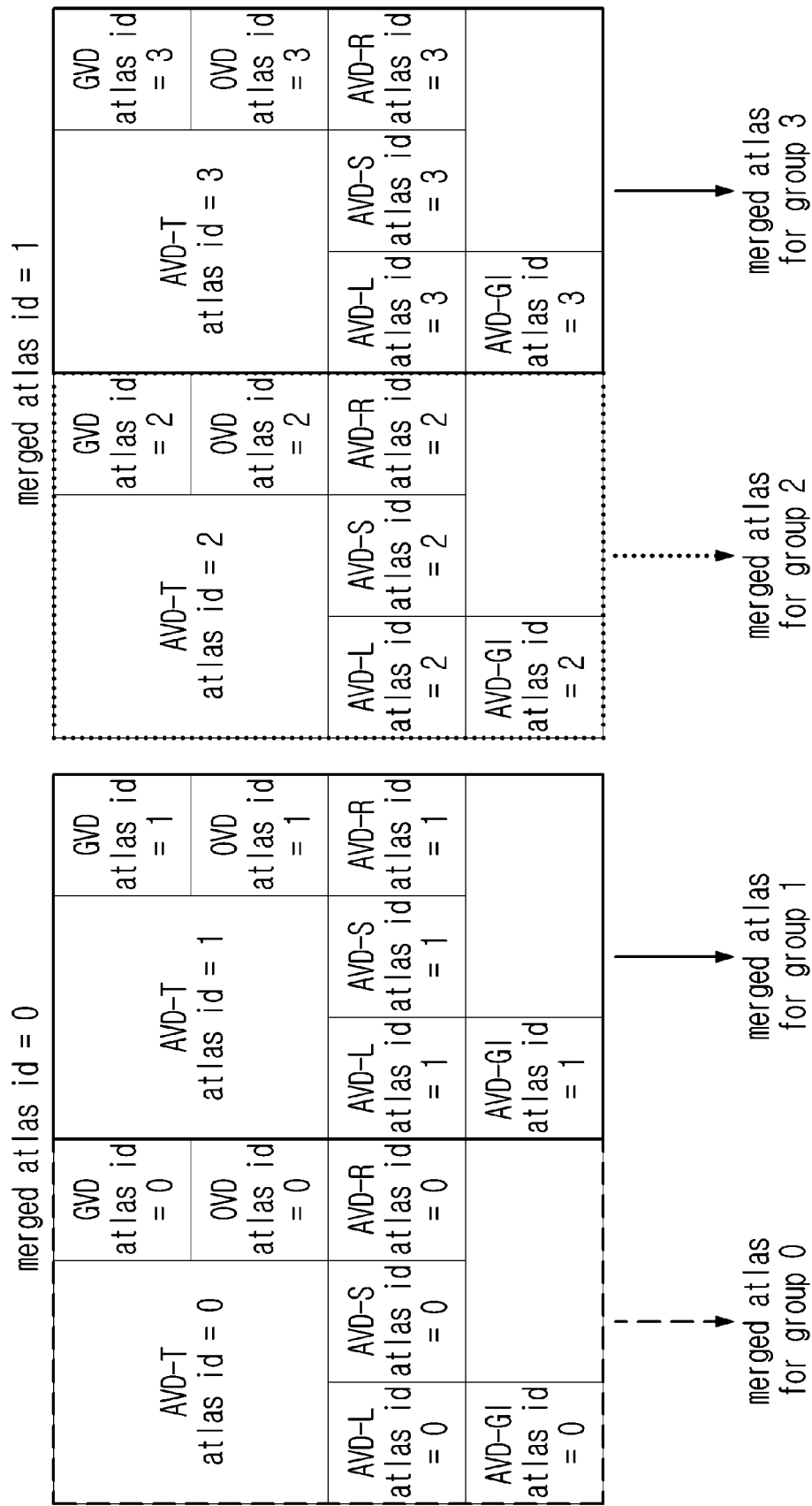
FIGS. 15A and 15B are view showing an example of generating a merged atlas by merging a plurality of group atlases.
Figure 15B:
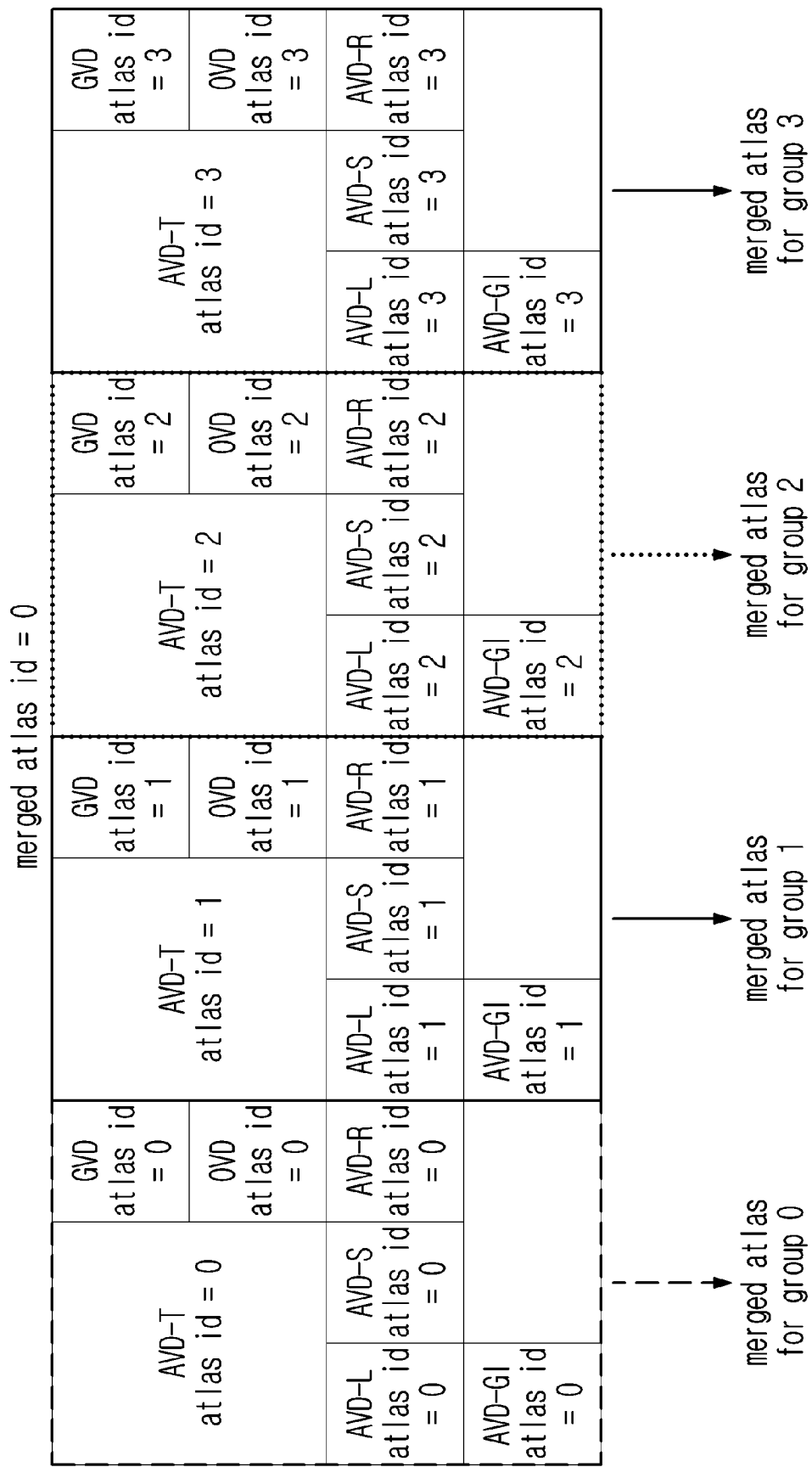

FIGS. 15A and 15B a view showing an example of generating a merged atlas by merging a plurality of group atlases.

The example shown in FIG. 15A shows an example of merging two group atlases into one merged atlas. The example shown in FIG. 15B shows an example of merging four group atlases into one merged atlas.

In order to increase encoding efficiency of the merged atlas, data of a basic image and data of an additional image may be disposed in a separate spatial region.

FIG. 16 is a view showing an example of disposing data of a basic image and data of an additional image in a separate spatial region.

In FIG. 16, a Basic View's Patch (BVP) indicates data of a basic image and a Non-Basic View's Patch (NBVP) indicates data of an additional image.

As in the example shown in FIG. 16, the data of the basic image is disposed on the left side of the merged atlas and then the data of the additional image may be disposed in the merged atlas.

Information related to the merged atlas, that is, merged atlas configuration information, may be encoded into metadata. The immersive video output apparatus may reconstruct a plurality of atlases merged into a merged atlas based on the information on the merged atlas (S804). Table 1 shows metadata related to the merged atlas.

TABLE 1

| Order | Metadata name | Metadata role |
|---|---|---|
| 1 | afti_merged_atlas_flag | Whether the atlas is a merged atlas or not |
| 2 | vps_merged_video_present_flag | Whether merged atlas information is present in a bitstream |
| 3 | merged_atlas_id | Identifier value of a merged atlas |
| 4 | mvi_merged_video_count_minus1 | Total number of merged atlases |
| 5 | mvi_merged_video_type | Type of merged atlas<br>0: texture attribute information<br>1: depth map information<br>2: occupancy map information<br>3: lighting attribute information<br>4: reflection attribute information<br>5: refraction attribute information<br>6: global illumination attribute information |
| 6 | afti_merged_atlas_mandatory_flag | Whether the merged atlas includes information essential for rendering |

TABLE 1-continued

| Order | Metadata name | Metadata role |
|---|---|---|
| 7 | num_atlases | Number of atlases in merged atlas |
| 8 | atlas_pos_x and atlas_pos_y | Position of top left corner of each atlas in the merged atlas |
| 9 | atlas_width and atlas_height | Width and height of each atlas in the merged atlas |
| 10 | afti_tile_type | Type of each atlas in the merged atlas<br>0: texture attribute information<br>1: depth map information<br>2: occupancy map information<br>3: lighting attribute information<br>4: reflection attribute information<br>5: refraction attribute information<br>6: global illumination attribute information |
| 11 | afti_tile_atlas_id | Identifier value corresponding to each atlas in the merged atlas |
| 12 | afti_signalled_tile_orientation_flag | Whether the atlas rotates in the merged atlas |
| 13 | afti_tile_orientation_index | Angle by which the atlas rotates in the merged atlas<br>0: rotates by 0 degrees clockwise<br>1: rotates by 90 degrees clockwise<br>2: rotates by 180 degrees clockwise<br>3: rotates by 270 degrees clockwise<br>4: left-right inversion<br>5: rotates by 90 degrees clockwise after left-right inversion<br>6: rotates by 180 degrees clockwise after left-right inversion<br>7: rotates by 270 degrees clockwise after left-right inversion |
| 14 | afti_tile_group_id | Group identifier of each atlas in the merged atlas |

The metadata bitstream includes a v3c_parameter_set structure including metadata (e.g., at least one of the number of atlases or the size of the atlas) necessary to decode the bitstream. A merged_video_information structure which is a set of metadata about the merged atlas may be added to the above structure.

FIGS. 17 and 18 show examples thereof.

In FIG. 17, a vps_merged_video_present_flag indicates whether information on the merged atlas in the bitstream is present. When the value of the syntax vps_merged_video_present_flag is 1, a merged_video_information structure may be called.

In FIG. 18, a syntax mvi_merged_video_count_minus1 indicates the total number of merged atlases minus 1.

A syntax mvi_merged_viudeo_type indicates the type of the merged atlas. Herein, the type indicates the type of atlases included in the merged atlas. For example, a syntax mvi_merged_video_type may indicate at least one of texture, depth, atlas occupancy map, lighting, reflection, refraction or global illumination.

The bitstream includes an atlas_frame_tile_information structure in which tile partitioning information is defined, in order to support the spatial random access service based on the tile partitioning structure. If each of the atlases included in the merged atlas is treated as one tile, the position and size of each atlas in the merged atlas may be obtained using the above structure.

Meanwhile, a merged atlas type, an identifier of the merged atlas or atlas rotation information may be added to the above structure.

FIG. 19 is a view showing a atlas_frame_tile_information structure including tile partitioning information of an atlas.

In FIG. 19, a syntax afti_single_tile_in_atlas_frame_flag indicates whether the atlas is composed of one tile. The value of afti_single_tile_in_atlas_frame_flag being 1 indicates that the atlas is composed of one frame. When the value of afti_single_tile_in_atlas_frame_flag is 0, the tile partitioning information may be additionally encoded/decoded.

A syntax afti_uniform_partition_spacing_flag indicates whether the atlas is partitioned into partitions having the uniform size. The value of afti_uniform_partition_spacing_flag being 1 indicates that the atlas is partitioned into partitions having the uniform size. In this case, a syntax afti_partition_cols_width_minus1 indicating the width of the partition and a syntax afti_pratition_rows_height_minus1 indicating the height of the partition may be further encoded/decoded.

The value of afti_uniform_partition_spacing_flag being 0 indicates that the atlas is not partitioned into partitions having the uniform size. In this case, a syntax afti_partition_column_width_minus1 indicating the width of each partition column and a syntax afti_partition_rows_height_minus1 indicating the height of each partition row may be encoded/decoded.

A afti_single_partition_per_tile_flag indicates whether a partition partitioning structure and a tile partitioning structure are the same. For example, the value of afti_single_partition_per_tile_flag being 1 indicates that each partition configures a tile.

If the value of afti_single_partition_per_tile_flag is 0, information on the number of partition columns and the number of partition rows included in the tile may be further encoded/decoded. For example, a syntax afti_top_left_partition idx[i] indicates a top left partition index of an i-th tile.

A syntax afti_bottom_right_partition_column_offset[i] indicates a difference in width between a top left partition and a bottom right partition of the i-th tile. That is, the above syntax may indicate a difference in index between a partition column, to which the top left partition belongs, and a partition column, to which the bottom right partition belongs.

A syntax afti_bottom_right_partition_row_offset[i] indicates a difference in height between the top left partition and the bottom right partition of the i-th tile. That is, the above syntax may indicate a difference in index between a partition row, to which the top left partition belongs, and a partition row, to which the bottom right partition belongs.

A syntax afti_signalled_tile_id_flag indicates whether the identifier of each tile is signaled. When afti_signalled_tile_id_flag is 1, a syntax afti_tile_id indicating the identifier of each tile may be additionally encoded/decoded.

When the syntax afti_signalled_tile id flag is 0, identifiers may be sequentially assigned to tiles.

The immersive video output apparatus may reconstruct atlases included in the merged atlas, by referring to the tile partitioning structure of the atlas.

FIG. 20 is a view showing elements including merged atlas information corresponding to each tile.

The structure of FIG. 20 may be included in the atlas_frame_tile_information structure described with respect to FIG. 19 or may be defined as a separate structure.

In FIG. 20, a syntax afti_merged_atlas_flag indicates whether the atlas is a merged atlas.

In addition, a syntax afti_merged_atlas_mandatory_flag indicates whether the atlas includes information essential for rendering. For example, afti_merged_atlas_mandatory_flag being 1 indicates an essential type atlas and afti_merged_atlas_mandatory_flag being 0 indicates an additional type atlas.

When the atlas is a merged atlas, a syntax afti_tile_type indicating the type of each of atlases configuring the merged atlas may be additionally encoded/decoded. For example, a syntax afti_tile_type[i] indicates the type of an atlas disposed in an i-th tile in the merged atlas and indicates at least one of texture, depth, atlas occupancy map, lighting, reflection, refraction or global illumination.

A syntax afti_tile_atlas_id[i] indicates an identifier value assigned to an atlas disposed in an i-th tile in a merged atlas.

A syntax afti_tile_group_id[i] indicates an identifier value assigned to an i-th tile group in a merged atlas.

A syntax afti_signalled_tile_orientation_flag indicates whether an atlas in a merged atlas is rotated and/or inverted. When the value of the syntax afti_signalled_tile_orientation_flag is 1, a syntax afti_tile_orientation_index[i] indicating whether the atlas is rotated and/or inverted may be further encoded/decoded. For example, a syntax afti_tile_orientation_index[i] indicates the rotation and/or inversion state of an atlas corresponding to an i-th tile.

Although not shown, information indicating the identifier of a group, to which atlases included in a merged atlas belong, may be additionally encoded.

The improved immersive video processing method and the improved immersive video output method have been described with reference to FIGS. 6 to 8. However, the shown drawings do not imply that all steps shown in the drawings are necessarily performed. Some of the shown steps may be omitted or new steps may be added between the shown steps.

According to the present disclosure, it is possible to reduce the number of required encoders/decoders, by merging a plurality of atlases into one atlas.

It will be appreciated by persons skilled in the art that that the effects that can be achieved through the present disclosure are not limited to what has been particularly described hereinabove and other advantages of the present disclosure will be more clearly understood from the detailed description.

The names of the syntax elements introduced in the above-described embodiments are only temporarily assigned to describe the embodiments of the present disclosure. The syntax elements may be called names different from those proposed in the present disclosure.

In the above-described embodiments, the methods are described based on the flowcharts with a series of steps or units, but the present disclosure is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present disclosure.

The embodiments include various aspects of examples. All possible combinations for various aspects may not be described, but those skilled in the art will be able to recognize different combinations. Accordingly, the present disclosure may include all replacements, modifications, and changes within the scope of the claims.

The embodiments of the present disclosure may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present disclosure, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a machine language code formatted by a compiler but also a high level language code that may be implemented by a computer using an interpreter. The hardware devices may be configured to be operated by one or more software modules or vice versa to conduct the processes according to the present disclosure.

Although the present disclosure has been described in terms of specific items such as detailed elements as well as the limited embodiments and the drawings, they are only provided to help more general understanding of the disclosure, and the present disclosure is not limited to the above embodiments. It will be appreciated by those skilled in the art to which the present disclosure pertains that various modifications and changes may be made from the above description.

Therefore, the spirit of the present disclosure shall not be limited to the above-described embodiments, and the entire scope of the appended claims and their equivalents will fall within the scope and spirit of the disclosure.

What is claimed is:

1. A method of producing an immersive video, the method comprising:
    decoding a merged atlas;
    obtaining configuration information of the merged atlas from a bitstream;
    reconstructing a plurality of atlases included in the merged atlas based on the configuration information; and
    generating a viewport video using at least one of the atlases,
    wherein the merged atlas is a single picture into which a plurality of atlases are merged, each of the atlases being a single picture comprising a plurality of patches,
    wherein the configuration information of the merged atlas comprises number information indicating the number of atlases included in the merged atlas,
    wherein the configuration information further comprises type information for an atlas in the merged atlas, and
    wherein the type information represents a type of the atlas that is included in the merged atlas.

2. The method of claim 1, wherein
    each of the atlases in the merged atlas forms an independent tile.

3. The method of claim 1, wherein the configuration information further comprises position information of each of the atlases in the merged atlas, the position information indicating a position of an atlas in the merged atlas.

4. The method of claim 3, wherein
    a type represented by the type information comprises at least one of a texture type, a geometry type, a lighting type, a reflection type, a refraction type or a global illumination type.

5. The method of claim 1, wherein the configuration information further comprises orientation information of an atlas included in the merged atlas, and
    wherein the orientation information indicates whether the atlas in the merged atlas is in a rotated stated or not.

6. The method of claim 1, wherein a plurality of views are classified into a plurality of groups, and
    wherein the plurality of atlases included in the merged atlas comprise information on views included in only one of the plurality of groups.

7. The method of claim 1, wherein the method further comprises:
    decoding a flag indicating whether the configuration information for the merged atlas is present in a bitstream or not, and
    wherein the configuration information for the merge atlas is decoded in response to the flag indicating that the configuration information is present in the bitstream.

* * * * *